United States Patent
Pleshoyano

(10) Patent No.: US 12,260,180 B1
(45) Date of Patent: Mar. 25, 2025

(54) NATURAL LANGUAGE TEXT ANALYSIS

(71) Applicant: KNOWEXT INC., Montréal (CA)

(72) Inventor: Stefan Pleshoyano, Montréal (CA)

( * ) Notice: Subject to any disclaimer, the term of this patent is extended or adjusted under 35 U.S.C. 154(b) by 0 days.

(21) Appl. No.: 18/600,339

(22) Filed: Mar. 8, 2024

Related U.S. Application Data

(60) Provisional application No. 63/591,293, filed on Oct. 18, 2023.

(51) Int. Cl.
*G06F 40/30* (2020.01)

(52) U.S. Cl.
CPC ................................. *G06F 40/30* (2020.01)

(58) Field of Classification Search
CPC ........................................................ G06F 40/30
See application file for complete search history.

(56) References Cited

U.S. PATENT DOCUMENTS

| | | | |
|---|---|---|---|
| 7,823,061 B2 | 10/2010 | Chan et al. |
| 9,110,883 B2 | 8/2015 | Ghannam et al. |
| 9,959,328 B2 | 5/2018 | Jain et al. |
| 10,176,164 B2 | 1/2019 | Alba et al. |
| 10,325,020 B2 | 6/2019 | Burke et al. |
| 10,380,240 B2 | 8/2019 | Ideuchi et al. |
| 10,402,435 B2 | 9/2019 | Jain et al. |
| 10,402,499 B2 | 9/2019 | Burchard |
| 10,409,805 B1 | 9/2019 | Jain et al. |
| 10,467,344 B1 | 11/2019 | Jade et al. |
| 10,503,769 B2 | 12/2019 | Ghannam et al. |
| 10,929,420 B2 | 2/2021 | Xu et al. |
| 11,126,647 B2 | 9/2021 | Rollings et al. |
| 11,182,562 B2 | 11/2021 | Lee et al. |
| 11,188,707 B1 | 11/2021 | Freundlich et al. |
| 11,194,956 B2 | 12/2021 | O'Neill |

(Continued)

FOREIGN PATENT DOCUMENTS

| | | |
|---|---|---|
| CN | 105243111 A | 1/2016 |
| CN | 107038336 A | 8/2017 |

(Continued)

OTHER PUBLICATIONS

Young, Tom, et al. "Recent trends in deep learning based natural language processing." ieee Computational intelligenCe magazine 13.3 (2018): 55-75. https://arxiv.org/pdf/1708.02709.pdf%C2%A0.

(Continued)

*Primary Examiner* — Eric Yen
(74) *Attorney, Agent, or Firm* — Anglehart et al.

(57) ABSTRACT

Systems and methods for performing non-statistical text analysis are provided. Essentially unconstrained natural language text may be segmented into individual terms, which are assigned a semantic category with the aid of a category lexicon and category association table. Categorized terms may be grouped into expressions if they commonly refer to a concept. Terms, as well as information about their categories and groupings into expressions, may be organized into information blocks, which each may contain a discrete piece of information about a text. Information blocks may be used to populate a database about the text. Information blocks may be queried to answer a question, be compared to identify inconsistencies in the text, be used to identify functions to execute from a user's command, or how to respond to a user during a dialog.

23 Claims, 9 Drawing Sheets

(56) References Cited

U.S. PATENT DOCUMENTS

| | | |
|---|---|---|
| 2003/0229857 A1 | 12/2003 | Sayuda et al. |
| 2006/0285152 A1 | 12/2006 | Skillen |
| 2007/0240044 A1* | 10/2007 | Fux .................. G06F 3/0237 715/257 |
| 2010/0114558 A1* | 5/2010 | Fluhr ................. G06F 40/49 704/5 |
| 2011/0119577 A1* | 5/2011 | Audant ............. G06F 40/253 715/256 |
| 2012/0191445 A1* | 7/2012 | Markman ........... G06F 40/45 704/9 |
| 2014/0181128 A1 | 6/2014 | Riskin et al. |
| 2014/0324808 A1* | 10/2014 | Sandhu ............. G06F 16/31 707/706 |
| 2014/0365232 A1 | 12/2014 | Sadeghi |
| 2015/0178270 A1 | 6/2015 | Zuev et al. |
| 2015/0356057 A1 | 12/2015 | Subramanian et al. |
| 2015/0356270 A1 | 12/2015 | Devarakonda et al. |
| 2016/0364377 A1 | 12/2016 | Krishnamurthy |
| 2016/0364608 A1 | 12/2016 | Sengupta et al. |
| 2017/0154029 A1 | 6/2017 | Kane |
| 2017/0185581 A1* | 6/2017 | Bojja ............ G06V 30/19173 |
| 2017/0337167 A1* | 11/2017 | Byron ................. G06F 16/93 |
| 2017/0344534 A1 | 11/2017 | Scally et al. |
| 2018/0039907 A1 | 2/2018 | Kraley |
| 2018/0329879 A1 | 11/2018 | Galitsky |
| 2019/0065462 A1 | 2/2019 | Salloum et al. |
| 2019/0259387 A1 | 8/2019 | Mertens et al. |
| 2020/0073516 A1 | 3/2020 | Gold et al. |
| 2020/0097549 A1 | 3/2020 | Parng et al. |
| 2020/0312463 A1 | 10/2020 | Bronkalla et al. |
| 2020/0349179 A1 | 11/2020 | Kong et al. |
| 2020/0387569 A1 | 12/2020 | Nakayama et al. |
| 2021/0049239 A1 | 2/2021 | Li et al. |
| 2021/0182496 A1 | 6/2021 | Shi et al. |
| 2021/0200761 A1 | 7/2021 | Li et al. |
| 2021/0216576 A1 | 7/2021 | Staub et al. |
| 2021/0232770 A1 | 7/2021 | Lin et al. |
| 2021/0272663 A1 | 9/2021 | Sakaguchi et al. |
| 2021/0287800 A1 | 9/2021 | Ghosh et al. |
| 2022/0121822 A1 | 4/2022 | Zhou et al. |
| 2022/0148691 A1 | 5/2022 | Katouzian |
| 2023/0026050 A1* | 1/2023 | Madan ................ G16H 10/60 |
| 2023/0370398 A1* | 11/2023 | Vort .................. H04L 51/04 |

FOREIGN PATENT DOCUMENTS

| | | |
|---|---|---|
| CN | 108984724 A | 12/2018 |
| CN | 109215754 A | 1/2019 |
| CN | 109977417 A | 7/2019 |
| CN | 111967241 A | 11/2020 |
| CN | 111986770 A | 11/2020 |
| CN | 112734202 A | 4/2021 |
| CN | 112818093 A | 5/2021 |
| CN | 113722418 A | 11/2021 |
| CN | 114049971 A | 2/2022 |
| KR | 101716654 B1 | 3/2017 |
| WO | 2020/074017 A1 | 4/2020 |
| WO | 2020/082612 A1 | 4/2020 |
| WO | 2021/208444 A1 | 10/2021 |
| WO | 2022/041723 A1 | 3/2022 |

OTHER PUBLICATIONS

Liu, Bang, et al. "Matching natural language sentences with hierarchical sentence factorization." Proceedings of the 2018 World Wide Web Conference. 2018. https://dl.acm.org/doi/pdf/10.1145/3178876.3186022.

Liu, Linlin, et al. "Hierarchical pointer net parsing." arXiv preprint arXiv: 1908.11571 (2019). https://arxiv.org/pdf/1908.11571.pdf.

Banarescu, Laura, et al. "Abstract meaning representation (amr) 1.0 specification." Parsing on Freebase from Question-Answer Pairs. In Proceedings of the 2013 Conference on Empirical Methods in Natural Language Processing. Seattle: ACL. 2012. https://www.isi.edu/~ulf/amr/help/amr-guidelines.pdf.

Bender, Emily M., et al. "Layers of interpretation: On grammar and compositionality." Proceedings of the 11th international conference on Computational Semantics. 2015. https://aclanthology.org/W15-0128.pdf.

Abend, Omri, and Ari Rappoport. "Universal conceptual cognitive annotation (UCCA)." Proceedings of the 51st Annual Meeting of the Association for Computational Linguistics (vol. 1: Long Papers). 2013. https://aclanthology.org/P13-1023.pdf.

Banarescu, Laura, et al. "Abstract meaning representation for sembanking." Proceedings of the 7th linguistic annotation workshop and interoperability with discourse. 2013. https://aclanthology.org/W13-2322.pdf.

Cheng, Zhoujun, et al. "Hitab: A hierarchical table dataset for question answering and natural language generation." arXiv preprint arXiv:2108.06712 (2021). https://arxiv.org/pdf/2108.06712.pdf.

International application No. PCT/CA2024/051378 International Search Report dated Jan. 29, 2025.

International application No. PCT/CA2024/051378 Written Opinion of the International Searching Authority dated Jan. 29, 2025.

\* cited by examiner

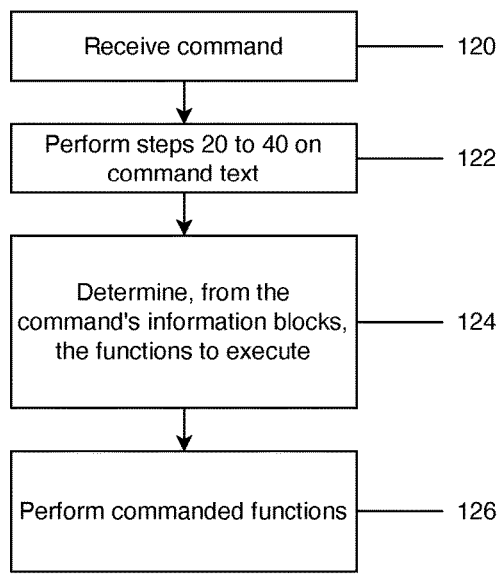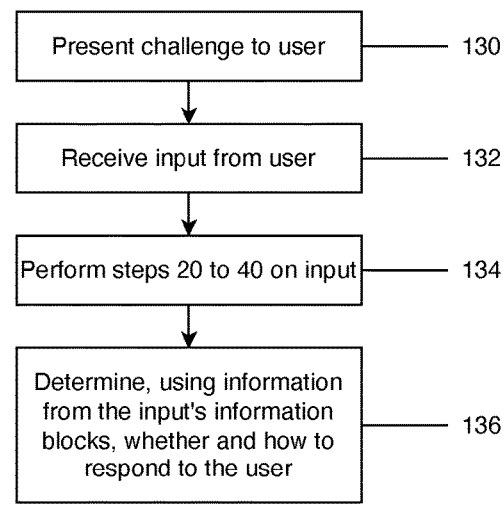
Figure 6                               Figure 7

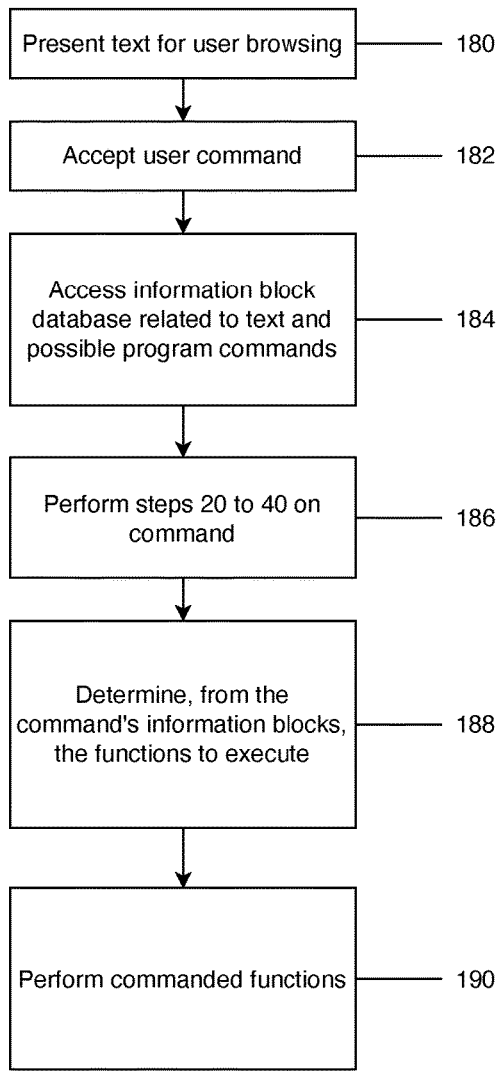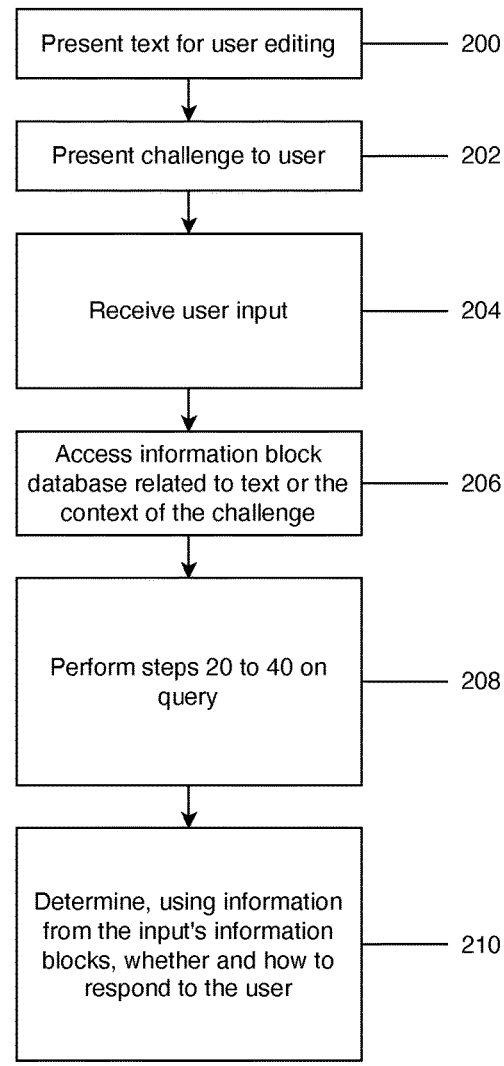
Figure 10
Figure 11

NATURAL LANGUAGE TEXT ANALYSIS

This application claims priority from U.S. provisional patent application 63/591,293 filed Oct. 18, 2023, the contents of which are hereby incorporated by reference.

TECHNICAL FIELD

The present patent application relates to the field of natural language text analysis, for example text analysis in which the text being analyzed is unconstrained.

BACKGROUND

Text analysis can use one or a combination of approaches, namely statistical or non-statistical. In statistical text analysis, the frequency and the proximity of words in a text are analyzed to formulate a conclusion about the meaning, topic or some other attribute of the text. In non-statistical approaches, the text is analyzed using rules that may or may not be based on statistical analysis of similar texts, and the result of the rule-based analysis is used to formulate a conclusion about the meaning, topic or some other attribute of the text.

In U.S. Pat. No. 9,110,883 to Ghannam et al., there is described a system for analyzing natural language texts that employs a parsing and rule-based analysis technique to produce from a text a series of what is called semantically-interpretable syntactic representations (SISR) that contain a syntax template and semantic clause annotations. By reducing the text into the SISR format, operations such as query answering, translation, summarization, information extraction, disambiguation and parsing is made easier. Ghannam also describes that a query can be transformed in the SISR format to facilitate finding an answer within the text converted to SISR format.

SUMMARY

Applicant has found that non-statistical analysis of text can be effective and reliable in providing an ability to structure and analyze information contained within the text.

Systems and methods for performing non-statistical text analysis are provided. Essentially unconstrained natural language text may be segmented into individual terms, which are assigned a meaning and a semantic category with the aid of conventional parsing, a category lexicon and a category association table. Then, individual terms may be grouped into expressions if they depend on each other for meaning (e.g., forming an idiomatic expression). Terms, as well as information about their categories and groupings into expressions, may be standardized and then organized into information blocks, which each may contain a discrete piece of information about a text. Information blocks may be structured into hierarchical forms of data and may be used to populate at least one database about the text. The databases may be queried to answer a question, be compared to identify inconsistencies in the text, be used to identify functions to execute from a user's command, or how to respond to a user during a dialog.

Applicant has found that structuring information about a text in this way allows for convenient and efficient locating of information. Applicant's system may receive questions about the text and be able to response to those questions. Applicant's system may also receive additional contributions and identify an inconsistency or a contradiction between such contributions and the original text. The text analysis at the foundation of such information locating remains the same whether one is looking for answers or consistency.

As an extension, Applicant has also found that a script can be used to initiate a dialog with a user. The script may take the form of a questionnaire. A user's answers may be used as contribution text if the user has information that is of value to the text. If a user's answer is inconsistent with the text, the user may be questioned about the inconsistency so that the text's accuracy can be improved. Alternatively, the inconsistency may be flagged for an operator, supervisor or other user to investigate to perform or approve the correction. If a user answers with a question, the answer may be provided using the knowledge of the text.

Applicant has found that a well-developed set of categories can be used to correctly interpret text in most any context. The predetermined nature of the analysis rules allows for the method described herein to function in various contexts without needing to be changed, although it is possible to configure the method with context-specific categories and rules. The predetermined nature of the analysis provides a measure of reliability and predictability to the method, compared to AI or statistical analysis methods which may create their own rules in unpredictable ways, and also allows an administrator to trace how the method arrived at certain conclusions, compared to AI or statistical analysis methods which cannot substantiate the assertions they make.

Applicant has found that when text is correctly parsed using categories into information blocks, it is easier to identify a hierarchy of the blocks and to determine attributes of the blocks from the terms, term categories and the hierarchy.

BRIEF DESCRIPTION OF THE DRAWINGS

The invention will be better understood by way of the following detailed description of embodiments of the invention with reference to the appended drawings, in which:

FIG. 6 is a flow chart setting out steps involved in command text analysis and response generation according to one embodiment.

FIG. 7 is a flow chart setting out steps involved in dialog text analysis and response generation according to one embodiment.

FIG. 10 is a flow chart setting out steps involved in presenting a document to a user while accepting a user command.

FIG. 11 is a flow chart setting out steps involved in presenting a document to a user while engaging in dialog with the user.

DETAILED DESCRIPTION

Figure 1:
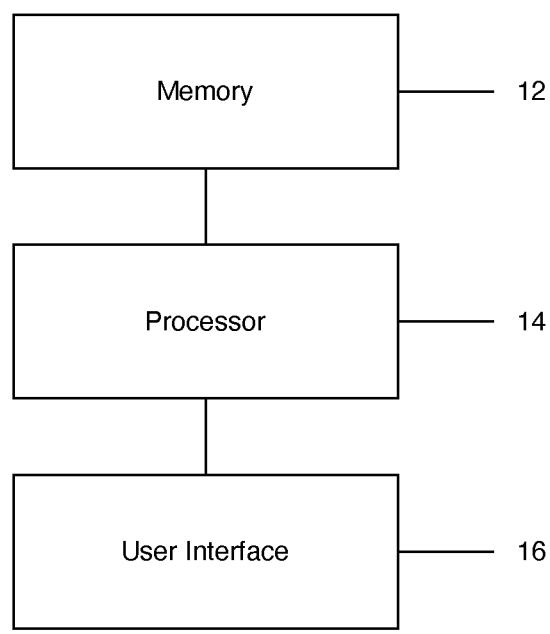
FIG. 1 is a schematic diagram of a computing device.

The present disclosure relates to systems and methods for non-statistical text analysis.

The examples provided herein are for illustrative purposes only and should not be interpreted as limiting the scope of the disclosure, and may be adapted to a reader not intimately familiar with the inner workings of the method, for simplicity.

The present disclosure describes methods that are able to distill essentially unconstrained natural language text into suitably structured, annotated data, and then use that data to perform a variety of functions. Essentially unconstrained natural language text refers to text that is not constrained to a limited set of vocabulary that is pre-programmed as recognizable by a computer method. The overall functionality and usefulness will be briefly explored before the method is described in greater detail.

Suitably structured, annotated data refers to a way of organizing information from a text that can easily be read and organized by a computer. For example, while a computer may not be able to easily read natural language, it may be able to easily organize keywords identifying subjects or objects in a text (e.g., "Bill") with keywords describing variables of the subject or object (e.g., "happy" describing the variable of 'emotional state' in link with Bill. Thus, when the computer is asked, "What is the emotional state of Bill?", it may simply search for "Bill ∩ emotional_state and return 'happy').

Having suitably structured, annotated data about a text allows a computer organize, search, compare, or act on the compiled information. Four non-limiting functions are focused on: contribution, query, command, and dialog, which will be explored in more detail with FIGS. 4-11 below. In query, the method may receive a natural language question (e.g., "How many screwdrivers are in the inventory?"), distill the question and then search through compiled data for the answer to the question. In contribution, the method may receive a natural language contribution (e.g., the addition of a passage to a text, or the submission of a new report in a database of reports), distill the contribution and then determine if the distilled information conflicts with existing compiled information (e.g., if a new report states that there are 5 pumps, and the existing information states that there are only 4 pumps, there is an inconsistency). In command, the method may receive a command (e.g., "Print the document", "Fill out the form"), distill the command and determine what functions to execute to fulfill the command. In dialog, the method may receive a natural language input from a user (e.g., "I am here to see the doctor."), distill the input and determine, from the input and additional information at its disposal, how to respond to the user (e.g., "Please provide your full name and the reason you are here to see the doctor.").

It is readily understood that such a method has broad utility. The ability to answer queries or identify inconsistencies in any text would be incredibly useful to a number of people in a number of professions. For example, researchers may ask questions about research papers to reduce the amount of time spent reading them, lawyers may ask questions about court decisions, medical professionals may be alerted to inconsistencies in their patient evaluations, secretaries may be alerted to inconsistencies or misunderstandings in emails regarding scheduling, writers may greatly improve the efficiency of their word by being alerted to inconsistencies in storyline or characters, etc. An important aspect is the ability to compile or synthesize information from a large number of separate documents, such as a compendium of reports gathered by the employees of a large organization, or multiple webpages online. The method may be integrated with various other applications, such as text editors, scheduling applications, messaging applications, autocorrection programs, etc. Commands and dialogs are equally useful. The ability to request something of a computer via a command eliminates the need for certain UIs and increases work efficiency. In some cases, when integrated with other technology such as speech to text, it may empower certain groups, such as the blind, to more easily control and engage with computers. Dialog may be used in a number of contexts that requires self-reporting, such as in a medical clinic where patients provide their personal information, or any organization that requires employees to report on their tasks (e.g., plumbers reporting what repairs were made and using which parts, or electricians reporting which parts of the grid were functioning). Additional exemplary embodiments will be discussed toward the end of this document.

The method described herein may be implemented on conventional computers, as shown in FIG. 1. In some embodiments, the computing device may have a memory 12 capable of storing items related to performing the method described herein, such as application data, data tables, or suitably structure, annotated data distilled from a text. In some embodiments, the computing device may have a processor 14 capable of performing the various tasks involved in performing the method described herein. In some embodiments, the computing device may have a user interface 16 capable of displaying information to a user, such as the user's text query, or a number of inconsistencies in the user's document.

Figure 2:
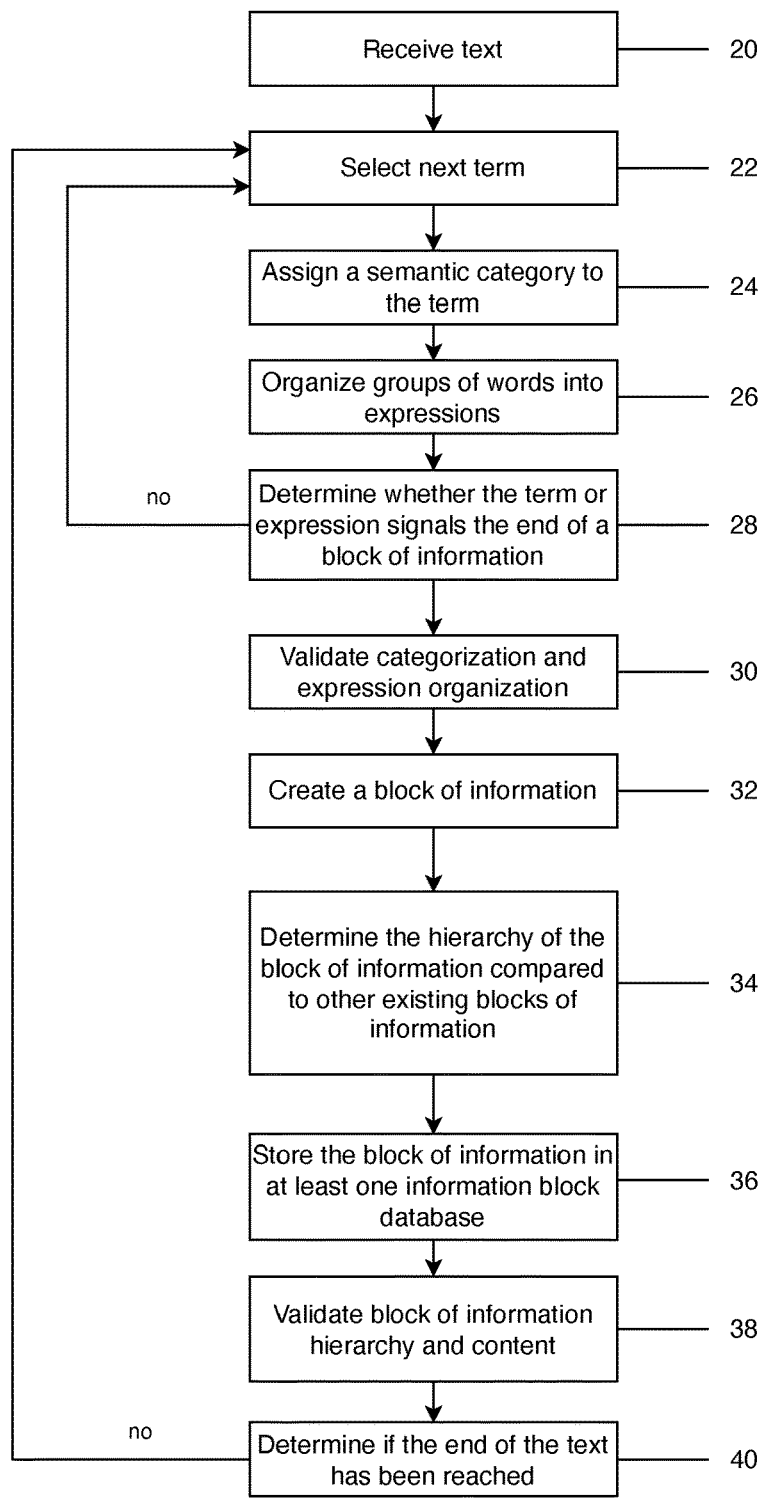
FIG. 2 is a flow chart setting out steps involved in text analysis according to one embodiment.

One embodiment of the method is shown in FIG. 2. In this embodiment, the computing device may receive an input of text 20. The text input may be short, such as a sentence, or long, such as a hundred-page document. The input may be continuous (e.g., as a person types) or discrete (e.g., inputting a whole text document), or semi-continuous (e.g., by sentence, or paragraph). In some embodiments, the method may be equipped with a module for optical character recognition (OCR) for reading text in images. In some embodiments, the method may read text within, or in between images. The method is configured to be able to read text in various fonts, forms, document formats, etc.

Once the input is received, the method may select 22 the next term (or, if it is the first iteration of the method on the text input, the first term). This may involve reading the text character by character until a space or word separator is reached. The isolated word is the term.

Selecting the next term may be referred to as parsing through the text. Generally, conventional parsing programs may be used to identify the possible definitions of the term to be categorized, and also to determine what class of word the term is (e.g., noun, verb, adjective, etc.). In a preferred embodiment, this information may be used for the categorization process described below.

Next, the method may assign a semantic category to the term 24, also referred to as categorization. Semantic category essentially refers to what kind of a word the term is. A category may for example be a date, a title, a frequency, a location, a name, a material, etc. Through multiple iterations of steps 20-40, all terms (words) in an input text will be categorized eventually. Although captured in one step in FIG. 2, the assignment of the correct category to a word is a complex process and will be explored in more detail below. In one embodiment, the main steps of categorization are first, looking up all potential categories of a word, and second, determining which category is most likely to be correct.

The category may not be so specific as to refer to the exact definition of a word. For example, the word "granite" is of a category solid material. The category indicates that granite is a material. It does not explain that granite is a hard, rocky surface.

Some categories may be grouped into category groups. For example, category groups may include date, manufacturer, title, frequency, location, domain, position, name, material, etc. The date category group may include a category each for moments, periods, days, months, seasons and years. Thus, a term will be identified not only as marking a particular time or date but will be identified as denoting a day or a year. Each individual category may be assigned a code unique to that category that is recognizable by a computer. When an XML tag is used to associate the category with a term, the tag may comprise the full name of the category and subcategory, if any. Next, the term and its class may be used to search inside a category lexicon. In an ideal embodiment, a category lexicon, or semantic category lexicon, is a compilation of data that lists the possible categories, or semantic categories, for each term (or word). For example, 'Bill' may have the possible category of 'First name' (a person named Bill), or 'verb-present' (the act of billing), or 'unclassified object' (a dollar bill). Some terms may be associated with only one category. For example, 'encyclopedia' can only refer to the object that is a compendium of information-categorized as an 'unclassified subject'. In a first step of categorization, all possible categories of each term are compiled in a list of potential categories. In some embodiments, to expedite the search, the search within the category lexicon may be limited to the class of the term (e.g., if conventional parsing assigns "Bill" the class of "verb", the search in the category lexicon will quickly find the "verb-present" category).

In some embodiments, the category lexicon may be a dictionary-type table, however, other viable data structures may function equally well. In embodiments where the category lexicon is similar in content to a dictionary, it is understood that the method is capable of analyzing essentially unconstrained natural language text.

In some embodiments, the lexicon may group variations of the same term together, such as conjugated versions of a verb, or singular/plural forms of nouns, or British versus American versions of words (e.g., behaviour versus behavior).

In some embodiments, the lexicon may group synonyms of words together, such as technical names (FOB and RFID) or everyday words (cup and glass).

In some embodiments, the method may have access to a variety of category lexicons stored in a number of category lexicon databases. In some embodiments, there may be a general lexicon database that contains general terms used in the language of choice. In some embodiments, there may be a technical lexicon database adapted to the technical field of the user (e.g., medical field, which has access to medical terms, medication names, etc.). In some embodiments, there may be a client database, which includes terms specific to the client (e.g., internal process names, employee names, internal position names, etc.). In some embodiments, there may be a synonym database that extensively canvasses which terms may be equivalent to each other. In some embodiments, there may be an abbreviation database, which may be general, client-specific or field-specific, for keeping track of various abbreviations and their meanings. In some embodiments, there may even be other databases with other types of lexicons.

In some embodiments, the lexicon may be adaptable to the document itself or the needs of the user, such as incorporating new terms defined in the document (e.g., the character name 'Shade' will have a category separate from the word 'shade' denoting screen from direct light, Similarly, the character name 'Marina' will have a category separate from the word 'marina' denoting a harbor), or being connected to a database for updating new terms and categories (e.g., a medical professional may want their lexicon to update with new names of medications or diseases), or being a reduced lexicon to save on computation time when searching the lexicon for a term's categories for a user using only basic language.

In some embodiments, the method may be configured with categories to keep track of meta-data in the document. For example, the method may determine that the number that begins every paragraph is not a number that is referring to something in the text but is rather a paragraph number for keeping track of the location of the paragraph in the document. The number may be assigned a category of 'paragraph number', and it may be used to keep track of the location of the information adjacent to it in the text. In another example, the method may determine that a particular sentence is not related to the text around it, and may identify the sentence as being a title, or subtitle of a text or subsection of text, a footnote, a reference, etc. and categorize the text as such.

Once each term is associated with a list of all potential categories that it might have, the method may select the correct category from the list of potential categories. In an ideal embodiment, this involves using a category association table to determine which category is most likely to be correct. A category association table is a compilation of data that contains likelihoods of each term being of a particular category. The category association table may use certain contextual information inputs to determine which category is most likely the correct category.

In an ideal embodiment, the category association table is capable of receiving information about other terms in the document, such as term frequencies, location of terms, adjacent terms, etc. The information about other terms in the document may inform the category association table of which category is the correct category. For example, if the terms 'gun' or 'sergeant' or 'bang' are adjacent to or within 3 terms of the word 'fire', the word 'fire' is likely to refer to the action of firing a firearm than the combustion hazard or the act of dismissing an employee. In some cases where there are multiple potential categories for multiple terms in a sentence, (e.g., "Bill reacted with surprise", each term 'Bill', 'reacted' and 'surprise' may have many potential categories) the category association table may look at all possible combinations of categories to determine which are most likely. The most likely combination of categories may be outputted as the correct category.

In some embodiments, the category association table may receive meta information about the document. For example, it may receive information that the document in question is a medical document, and thus prioritize medical-oriented categories for terms.

In some embodiments, the category association table may receive user input about certain terms. For example, the user may inform the method that 'Shade' is most likely a character name, especially when capitalized.

In some embodiments, much like the category lexicons, there may be a number of databases holding different types of category association tables (e.g., client-specific, general, technical, etc.), and may be customized by user inputs or user settings.

In some embodiments, the method may determine that a term is misspelled, and may attempt to correct the spelling of the word. This may be achieved by determining that a given term (e.g., 'withuut', a misspelling of 'without') does not have any potential categories. This may also be achieved by determining, at the step of choosing a category from a list of potential categories, that all potential categories (despite being valid). For example, the word 'fore' has valid categories (front of a ship, warning to those in the path of a golf ball, nonstandard form of before). However, in a text full of mentions of 'gun', 'smoke', 'target', and various mentions of the word 'fire', the method may determine that none of the 'fore' categories are likely to fit in this context, and may determine that it is more likely that 'fore' is a misspelled version of 'fire'. In determining the possibility of a misspelling of a word, the method may identify the type of mistake (e.g., an added character too many, repeated characters, missing characters, two words fused together by mistake, etc.). The determination of the mistake may be informed by the type of mistake, the number of character corrections required to correct the mistake, and a number of other factors such as the proximity of the mistaken character to the correct character on a conventional keyboard. It can also be appreciated that when a potential or explicit typographical error is detected, the text analysis system may accept input from an operator or the author to correct the error.

Generally, the goal of categorization is to assign one meaning to each term. A computer will not be able to understand the subtlety of words with multiple meanings. Assigning to each term a single meaning ensures that a computer can differentiate between each term. As will be further explained below, the category of words is used to reduce the number of possible meanings, and in some cases, the term may be replaced by a synonym of a more precise meaning.

Most of the time, words will only have one meaning per category. For example, 'fire' can refer to the combustion reaction, to the action of dismissing an employee, or to the action of releasing a projectile from a weapon. When fire is used in a sentence to mean the combustion reaction (e.g., "the house is on fire"), the term "fire" may be categorized as a characteristic. The other meanings of "fire" would not be classified as a characteristic. Thus, by classifying the term "fire" as a characteristic, the computer is already able to differentiate from other meanings of the word.

However, there are cases where one word may have multiple meanings even within the same category. For example, the verb 'get' is a relatively general verb whose meaning can change subtly between uses. In the sentence "He got his driving license", the meaning of "got" is more akin to the active verb "obtained". In the sentence "I got a letter", the meaning of "got" is more akin to the passive verb "received". However, categories usually too general to distinguish between these subtle meanings. Both meanings of "got" may be assigned the same category of verb-past, for example. In order to identify to the method that a particular word is vague or has multiple meanings within a category, the method may have access to a list of words and categories which require further categorization.

In order to truly assign one meaning to each term, there may be cases where certain terms will need to be replaced by more precise synonyms. This process may be aided by a disambiguation table, which may contain various types of information that can be useful for distinguishing between multiple meanings of a particular word. For example, the disambiguation table may have access to a number of synonyms for difficult words such as "got", and have likelihoods associated with other terms. For example, the disambiguation table may determine that when the word "letter" is near "got", then the meaning of "got" is far more likely to be "received" than "obtained". Thus, "got" may be replaced by "received" for the purposes of the method.

It should be noted that synonyms may be grouped by their parent keyword. For example, general words such as "happy", "container" or "got" may refer to a large range of emotions, objects or actions. These parent keywords are useful for grouping various synonyms together (e.g., all synonyms of "happy" are grouped under the parent keyword "happy") both for finding more precise words in the categorization process and also for libraries/queries which are described below.

It should be noted that the various tables discussed throughout may be built using a variety of methods. The tables may be informed in part by user knowledge, allowing a user to customize the method to their particular needs or context. The tables may be informed by pre-made rules or information from the developer. The tables may also be informed by advanced statistical tools such as artificial intelligence which can quickly build extensive tables in different languages. The tables may be updated throughout use to respond to, for example, new situations, situations where the method has errors, situations where new words are used not seen anywhere else in language, etc.

The correct assignment of categories is of critical importance. It is the first complex step of the method, and much of what comes next will be dependent on the correct assignment of categories. Although advanced statistical methods such as AI may be used for the building of tables, this method in practice is a non-statistical approach, and thus it will not have the opportunity to 'understand' the meaning of each word beyond the assigned category. In other words, the computer may not be able to understand the word, or the meaning of the word, but it may be able to understand the category. Moreover, the method may use category information to distill information from the text, as will be seen below.

One category that will be important for the later steps is the block break category. Information blocks refer to units of information, and as will be seen below, they form the basic organizational and informational unit of the method. Information blocks may be analogized to a clause in a sentence or a sentence fragment. So, it is important to determine when information that should go in one block begins and ends. For example, in the sentence "Bill went to the market, but it was raining so he didn't have a great time.", the sentence may be separated into multiple blocks. The words 'but' and 'so' may act as information block breaks that separate different pieces of information in the sentence, and thus may be categorized as in the block break category.

The steps 20 to 24 may be referred to as the parsing of the text. In other words, the steps 20 to 24 analyze a sentence into its parts. However, it should be noted that the parsing performed by this method is different from other methods of parsing. Conventional parsing may be a step in assigning a category. However, the overall use of categories as opposed to reliance on mere definitions or classes of words allows the method much more flexibility and robustness, especially when information blocks, data structures and expressions are introduced (see below). The category not only contains information, for example, about the class of word, it also helps restrict the word to one particular meaning and informs the method about what information each term brings to the sentence. The use of categories is prone to much fewer errors than trying to determine identities of words exclusively through the rules of grammar, especially because rules of grammar may not be followed by input texts.

Once the correct category is assigned to each term, the method organizes the groups of words into expressions 26. At this step, the method groups words that are reliant on each other to convey the desired meaning. For example, the expression "hard to swallow" involves three words that are grouped together to convey the meaning that something is difficult to accept.

A first step of organizing words into expression may be to identify expressions. This is a complex step which involves iterating through the list of terms and determining whether adjacent (or non-adjacent) terms form an expression. The determination may be done using a number of expression rules, contained within an expression rules database. As the method iterates through terms in a sentence, the method determines whether the following word should be grouped with the previous word. In some embodiments, the method may include the meaning of the expression within the future information block.

A non-limiting example is provided: in the sentence "I find his excuses hard to swallow.", the sentence is arranged into its basic terms: I—find—his—excuses—hard—to—swallow—. The method may begin with the first term, "I", and determine that the adjacent terms are not linked to it. The same determination may be made for "find". However, the method may determine that the word "his" is referring to the adjacent word "excuses", and thus group the two words into the expression "his excuses". The method may determine that "excuses" is not linked to "hard".

The determination of whether two words are linked may be done by comparing their categories, and how their categories are combined. For example, the expression rules may contain a table that determines the likelihood of two categories being adjacent to each other and forming an expression. For example, it may be likely that a word of category pronoun forms an expression with an adjacent word of the category abstract concept (e.g., 'his' (pronoun) 'excuses' (abstract concept)). On the other hand, it may determine that the present verb "find" is not likely to be linked to the following pronoun "his".

In some embodiments, the above may be performed in what is called a Keyword Combination table. Such a table may include a list of all possible categories in the first row and first column of the table. The rest of the table may be made of cells containing a 1 or a 0. If the cell is a 1, it means that the category of the row is likely to form an expression when adjacent to the category of the column. If the cell is a 0, the category of the row is not likely to form an expression when adjacent to the category of the column. Thus, an expression is identified when the categories of two adjacent terms return a 1 in the table. Expressions may be more than two terms if the latter term, when compared with the next adjacent term, also returns a 1 form the keyword combination table. The expression continues until a 0 is obtained.

The determination of expression by the combination of categories may be particularly useful for identifying multi-word objects or names. For example, "The Smithsonian National Portrait Gallery" is a five-word expression referring to one object, whose categories are as follows: pronoun-name-descriptor-object-object. The expression rules may identify that an expression is likely when terms of those categories follow each other, and thus group the five words into one expression.

The determination of whether two words are linked may also be done by referring to one or more expression databases, which may hold particular combinations of terms or categories that should form expressions. For example, "raining cats and dogs" is an idiomatic expression and may not be properly recognized as an expression by the method unless it is found in an idiomatic expression database. Other potential expression databases include a general expression database, containing groups of terms that appear in everyday language (e.g., "turn on" a switch), or a local expression database, which may contain customized expressions tuned to local language, field-specific expressions, company-specific expressions, etc. The expressions may not be made of strictly adjacent words (e.g., "turn the switch on", "turn" and "on" are separated by "the switch").

In some embodiments, the method may group multiple terms together in an expression if it determines that the words are so unlikely to ever be grouped together, that the only possible explanation for their placement in the sentence is an expression that is not found in any of the expression databases that the method currently has access to. It may also alert the user to such an occurrence and ask a user for guidance on whether to treat the terms as an expression.

In some embodiments, the expression may be assigned its own category, to allow the method to recognize what information the expression is attempting to convey. The assignment may be done based on information contained in the expression rules, or expression databases. In this case, the expression may be given a category based on the categories of its component terms. In some cases, one less informative category may give way to a more informative category. For example, "his excuses" may be given the category of abstract concept, as the category of 'his' (pronoun) is less informative than the category of 'excuses' (abstract concept). In other cases, the category may be determined by the exact expression, or combination of terms or categories (e.g., "raining cats and dogs" may be assigned the category 'descriptor', despite none of its individual terms being a 'descriptor').

After words have been grouped into expressions, the method may undergo a process of standardizing the expressions. In a text, one object may be referenced a number of times in different ways. For example, "the Smithsonian National Portrait Gallery" may be called by its full name when it is introduced in a text, but subsequent references may call it merely "the gallery", "the Smithsonian", "the portrait gallery", or even "the museum". In a non-statistical text analysis, it may not be evident to a computer that these different expressions are referring to the same object. So, the method may detect that certain expressions refer to already established objects (e.g., "the gallery", 'the' indicates an already established object, 'gallery' is used to search previous terms to find "the Smithsonian National Portrait Gallery") and then replace subsequent references to established objects by the full name of the object (e.g., replacing "the gallery" by "the Smithsonian National Portrait Gallery"). By using the exact same, standardized expression for every reference to an object, a computer may understand that each instance of that standardized expression is referring to one object, without needing to understand the formulation of the expression. Of course, the standardized expression may be referring not only to an established object, but to an established idea, or action-any concept that was previously established may be referred to by a standardized expression in order to allow a computer to identify that subsequent references to it are referring to the same thing.

In some embodiments, the standardization process may involve assigning to each item in the text a unique identifier, which can be used for all subsequent references of the same object, to more easily signal to a computer that the references are to the same object.

In some embodiments, the standardization process may also be applied to individual terms that have not been grouped into expressions. Individual terms that refer to existing objects may be replaced by express reference to those existing objects.

Terms or expressions that are referring to an established term may be referred to as placeholder terms or placeholder expressions. Thus, their meaning may be context-dependent. For example, "Bill went to the market. It was packed." 'It' is a placeholder term for 'market'. In this case, the method may involve identifying that the word 'it' functions as a placeholder for other terms, and then may locate in the surrounding context which word 'it' is acting as a placeholder for. It may identify 'market' as the noun that 'it' is referring to and replace 'it' by 'market' for the remainder of the method. In some embodiments, 'it' or any other placeholder may refer to an entire other information block, not merely another term. In this case, the placeholder may be replaced by the whole information block or part of the sentence that 'it' is referring to.

In some embodiments, a placeholder may mean merely a reference to another term without using the full name of the term (e.g., 'the car' when referring to 'Bill's car'), and terms may be replaced by the full term. 'Full term' may also be understood as any term that provides enough information to distinguish the object from other similar objects in the text. This is done so that the method links information to the correct object. For example, there may be many cars referenced in one text, and the method needs to be able to identify each one separately (e.g., 'Bill's car', 'Bob's car', etc.). The method may not qualify terms with additional information until another similar term is encountered. For example, if the method encounters a car, Bill's car, in a text, it may merely treat the term as 'car'. Later in the text, other cars may be described (e.g., 'Bob's car'). As long as the new terms are different than the current terms ('car' vs 'Bob's car'), the two objects will correctly be treated differently by the method. So, while some terms in the compiled data may seem generic, the method is capable of differentiating them.

In some embodiments, a placeholder may also mean a synonym of a word (e.g., 'Bill's automobile' is still referring to 'Bill's car'), and the synonym may be replaced by the first recognized instance of that term ('Bill's car'). This is done so that the method correctly accumulates information linked to the one object, instead of having multiple unlinked instances of the same object from the text that are treated as separate objects in the compiled data.

In some embodiments, a placeholder may also mean a plural of a term, or a conjugation of a term, or any alternative formulation of a term that references the same term.

The process of standardization may include replacing terms or expressions that are synonyms for an established term by the established term. In some embodiments, the method may have access to a registered synonym database that can provide information that the method can use for detecting synonyms. This may be especially useful when a text refers to an object in multiple ways using entirely different words (e.g., "the Smithsonian National Portrait Gallery" being referred to as "the museum", or a character being referred to by their job title instead of their name). In some cases, the registered synonym database may be updated with new terms throughout the reading of the text, or may be initialized with additional information from the beginning.

In some embodiments, the process of standardization may refer to information block databases containing information blocks about the text. Thus, the process may have access to terms or expressions that have already been established in information blocks.

In some embodiments, the expressions may also undergo a conversion into a list. This may happen when the method recognizes that one expression is referring to multiple objects. For example, "Check pumps 1 through 4", the method may determine that the expression "pumps 1 through 4" refers to established pumps 'Pump 1', 'Pump 2', 'Pump 3' and 'Pump 4', and thus separate the original expression into four individual expressions "Check pump 1", "Check pump 2", "Check pump 3" and "Check pump 4". Any sentence establishing a list or reference to multiple objects (e.g., "I need to buy: eggs, flour, and vanilla", or "I need to paint the door and motor") may be separated. The separation of an expression referring to many objects into multiple expressions referring to individual objects may allow a computer to better keep track of individual elements, and eliminates the need for the computer to understand complex expressions referring to multiple objects. Like the identification of expressions, the identification of lists may be accomplished by analyzing the combination of term categories adjacent to each other. The categories are especially useful for identifying the presence of lists, as the lists can often span many words across a sentence.

In some embodiments, the method may validate that the separation is correct. For example, in the sentence "Paint and replace the motors and the door", the method may separate it into "Paint the motor", "Paint the door", "Replace the motor", and "replace the door". It may detect that 'paint' and 'motor' are two terms that are not likely to be associated. In such a case, it may change the separation to be "Paint the door" and "Replace the motor".

To accomplish the separation and validation of separation, the method may have access to a number of expression list rules. These rules may include a variety of data such as a list of terms, categories, term combinations or category combinations that need to be separated, or typically form correct or incorrect separations.

Once all linked terms are grouped into expressions, the method may then determine whether the term or expression signals the end of a block of information 28. Information blocks refer to units of information. Each one should contain a piece of information. For example, "Yesterday, I went to the mall." may be separated into three information blocks: I went—yesterday—to the mall. Categories of terms and expressions are relied upon to determine where and when these information blocks ends and another begins. 'To' (category block break) indicated the end of the "I went" block and the beginning of the "to the mall" block.

It is also possible for the method to determine the end or beginning of a new block of information based on block break rules. The block break rules may determine block breaking using information beyond the individual category of a term. For example, the method may determine that a combination of terms of a particular category signals the end of a block of information (e.g., "I went" may signal the end of the 'pre-statement' block, which contains information about the principal actor and the main action, without yet defining how that action was accomplished).

Although the method is capable of using punctuation information to inform its determinations, punctuation information is generally not used with great importance. Punctuation information can easily be misleading, especially because punctuation is used relatively inconsistently between users. In some embodiments, the method is capable of performing block breaking without any input from punctuation.

If a term is not determined to be of the block break category, or if a combination of terms do not fulfil the criteria of the block break rules to create a block break, the method repeats a new iteration from step 22 with the next term in the input text. It should be noted that all information about previous iterations is saved. This process may repeat until a term or expression of the block break category is found.

At this point, the method may validate the categorization and expression organization achieved up until this point 30. It is possible that information obtained during later iterations of the method (e.g., a categorization of a term at the end of a sentence) changes the categorization or expression organization of earlier iterations. If this is the case, the method re-categorizes or re-organizes the terms and expressions as needed until it can validate that, given all current information, the terms are correctly categorized and the expressions are properly organized.

The method may then create an information block 32, using the categorized terms and expressions provided by the previous steps. As briefly mentioned, information blocks refer to units of information. Each one should contain a piece of information from a text provided. When receiving a group of terms and expressions from step 30, the method may first merely instantiate an information block to contain those terms and expressions, along with associated information such as the categories of terms and expressions.

An information block may have multiple variables associated to it, or contained within it. A first variable may be the raw text which provides the information contained within the information block. This raw text may not be understood by a computer, but may be useful, for example, for answering user queries such as described below. Other variables associated with the information block may be the terms, term combinations, categories, category combinations, expressions and expression combinations of the raw text. All of this information may be obtained from the previous step 30.

Once instantiated, the method may determine the hierarchy of the information block 34. The hierarchy of an information block refers to if and how an information block is linked to other information blocks. There are two kinds of information blocks: primary information blocks and secondary information blocks. Primary information blocks contain the principal object of pieces of information. Secondary information blocks contain information related to information in primary blocks. For example, in the sentence "Yesterday, I went to the mall.", the primary block is "I went" and the secondary blocks are "yesterday," and "to the mall". The hierarchy of blocks is determined by a set of predetermined rules, that look at the contents of each block (the terms, term combinations, categories, category combinations, expressions, and expression combinations) to determine whether the block is of a primary or secondary nature, and if secondary, determine which primary block it is referring to. For example, in a block that contains terms of the "time" category (e.g., "yesterday,"), the information block will be secondary, as it must be qualifying a time of a primary block. The hierarchy of blocks may be determined in part by the type of block break that occurred between the blocks, or of other attributes or variables about the blocks (e.g., whether a block is conditional on another).

It is important to note that although information blocks are primary or secondary, the hierarchy of blocks is more complex than merely a two-level scheme because secondary blocks can be linked to other secondary blocks. So, in the sentence "I went to the mall where I bought a pan for cooking crepes.", "I went" is the primary block, while "to the mall" is a secondary block dependent on "I went", "I bought" is a secondary block dependent on "to the mall", "a pan" is a secondary block dependent on "I bought", and "for cooking crepes" is a secondary block dependent on "a pan".

It is also important to note that more than one block can be dependent on the same block. For example, "I went to the mall and then to the store", "to the mall" and "to the store" are both dependent on "I went" and are on the same level in the hierarchy.

Information blocks may contain a variable to keep track of their hierarchy and the blocks they are related to or dependent on. For example, "P1" may indicate that a block is dependent on primary block 1. "P3S7" may indicate that a block is dependent on the seventh secondary block of primary block 3. This may be useful for a computer to easily locate related blocks.

Additionally, information blocks may contain some information about the other blocks they are linked to. It may be useful to understand how one block is linked to another. Thus, another variable that information blocks may contain is the "last topic", which may refer to the main piece of information contained in the previous block of information (e.g., "I went"). Another variable that information blocks may contain is the "block break word", which may refer to the term used to separate the blocks. Often, these terms may contain additional useful information, such as whether the blocks are being opposed or contrasted (e.g., "but", "however", etc.).

In some embodiments, certain information blocks may be conditional. For example, in the sentence "I will go to the market if you give me money for groceries.", the action of going to the market is conditional on the giving of the money. The method should not consider "I will go to the market" as a fact. Thus, its information block will be conditional. The method may be configured to recognize that, if a subsequent information block contains information that the money for groceries has been received, then the condition is fulfilled and thus "I" should go to the market. This may be particularly useful for applications of the method in accounting or payment processing. Thus, each conditional block may have a variable for keeping track of whether the condition is fulfilled or not.

Another variable associated with information blocks may be their location within a text or document, or information about which document they can be found in. This will permit the method to identify exactly where the information originates, and help point a user to find that location if needed.

Another variable associated with information blocks may be their attributes which allow for a computer to further categorize them. Block attributes, or information block specific attributes, are information that may indicate the nature of the information block. Attributes may be keywords from a defined, limited list that indicate to a computer what kinds of information may be contained within a block, and can thus be used (much like categories) by computers to search, filter, or infer information.

For example, in the information block "some two decades ago", the fact that the main expression of the block "two decades ago" is of the category "moment" or "year" indicates that the information block's attribute is 'moment'. Thus, if a computer is asked about a time aspect, or a year, it can easily find blocks related to the "moment".

A primary block and all associated secondary blocks dependent on the primary block may be referred to as an observation.

Various attributes may exist, and primary and secondary blocks may be allowed to have different attributes. Type is a first attribute that a block might have. The type refers to the type of information stored in the block. For example, primary blocks can be of the type: action, state, or title.

Other attributes may exist to further qualify the type. These may be called sub-types. For example, primary blocks of the action type may be given, for example, an attribute of one of:
a) completed
b) planned
c) intended
d) suggested/recommended
e) mandatory/required
f) expected
g) cancelled
h) delayed.

Primary blocks of the state type may be further given an attribute of one of:
a) inventory
b) emotional
c) physical
d) mental/psychological.

Secondary blocks can have an attribute of, for example:
a) reason
b) condition
c) consequence
d) objective
e) position
f) location
g) moment
h) constraint
i) symptom
j) reference
k) means
l) manner
m) interval
n) origin
o) destination
etc.

Time is another example of a block attribute, such as past, present, future or conditional. Time would provide another axis of information on which to order, organize or search the different blocks.

Time may be an especially useful attribute for holding information about entities or aspects of entities that change over time. For example, 'Bill is happy' is not likely to be true over a long period of time. So, if the information block holding information that Bill is happy is also given an attribute of time, then it will not contradict with another information block holding information that Bill is sad as long as the time attribute is different, or significantly different. Time data is also important for various functionalities present in a preferred embodiment of the method, such as for correctly populating information block databases related to the state of objects, inventory databases or transaction databases. Thus, although not always necessary, it is generally preferable to have a time attribute.

Given the importance of the time attribute, the method may be configured to assign a hypothetical time attribute when a time attribute is not readily identifiable in the text of the information block. For example, the method may determine if time information is present in a related primary or secondary information block and assume that the same time information is relevant. In another example, the method may determine if time information is present in nearby unrelated information blocks. In some examples, if no time information is present, the method may merely determine that one information block occurred before or after certain times. For example, a story usually describes events in chronological order. So, if information block X does not have a time attribute, but occurred in between blocks Y and Z whose times are known, block's X time attribute may be "after time Y and before time Z". If no other time information is readily discernable, a hypothetical time attribute may be assigned, based for example on the time that the method received the information.

The assignment of hypothetical time attributes, which is information not explicitly present in the source text, may be accomplished when the method creates inferences.

In a preferred embodiment, all information blocks are assigned at least a hypothetical time attribute.

It will be appreciated that other potential block attributes may be used, depending on the implementation of the method.

Block attributes may be particularly useful for non-statistical text analysis. For example, if a question is asked "Where did I go yesterday?", a computer may not understand the raw text, but it can easily filter all blocks containing information about the subject "I", of the attribute "action", with the term "go" and its conjugations, and of the attribute "time". The resulting list of blocks will provide a foundation for the computer to easily create an answer to provide to the user.

In some embodiments, some information blocks may contain additional data about synonyms or related words about keywords within the information block. For example, an information block containing the keyword "horse" may automatically be tagged or filled with synonyms of the keyword such as "charger", "pony", "mount", "stallion", etc. or parent keywords such as "animal", "mammal", etc. These may be useful for the method to identify the information block, or make inferences about the text, without needing to rely on the keyword exclusively. For example, a user may query "who was Zoe's favourite animal", and in that kind of situation, it would be useful for the information blocks of various animals (including horses) to be identified also as animals.

The filling of information blocks with information about synonyms and related keywords may occur at the step of expression standardization, so as to ensure that the synonyms and related keywords match the rest of the keywords of the current text.

The information blocks may then be stored in one or more information block databases 36. Information block databases may be large tables that act as repositories for the information blocks, with each row being an entry and each column containing a variable of the entry. Different information block databases may have different columns, and thus contain different information. Information block databases may contain information about the state of the environment or the topic of the text.

In an exemplary embodiment, the method at least populates a general information block database. A general information block database is meant to contain all the information of the information blocks in raw form, such that it acts as a repository for all the information blocks created and updated by the method. It is generally recommended to have a general information block database, so that no data is lost when the information blocks are formatted into other information block databases which may only receive some of the information block's information as input.

In another exemplary embodiment, there are, in addition to the general information block database, three more specialized information block databases: a transaction database, a state database, and an inventory database. The transaction database may be in the form of a type of ledger, keeping track of information blocks that contain information about exchanges of objects, or changes of objects, as well as associated information (e.g., time of exchange, parties involved in exchange, etc.). The inventory database may contain information about all objects that exist within a given space, as well as associated information (e.g., inventory over time, etc.). The state database may contain information about the state of objects in a given space and at a given time, as well as associated information. There may also be a general database for keeping track of information blocks in their raw form, to prevent any information being lost as information blocks are adapted to different databases.

The more specialized information block databases may have fewer options for receiving information block information than the general information block database. For example, an inventory database may be configured only to receive information about object and their identity, their description and changes to their presence/absence/operability in the environment. The inventory database may be configured to only receive information that is not duplicating the current contents (e.g., subsequent references to a same pump that do not affect information in the inventory database won't each become their own row in the inventory database. Thus, the one pump will only have one entry in the inventory database, instead of one entry per mention in an input text). In another example, a state database may be configured only to receive information about objects, their identity, their description, and changes to their current functioning.

The specialized information block databases may, despite their name, refer to databases containing information in a very different form than the raw information blocks. The entries in these specialized databases may be information compiled from multiple information blocks, for example, or they may be populated with information obtainable only by performing an inference on the information blocks (discussed below). It is understood that the information block databases are not limited to a particular format or size, and thus can contain various types of information.

Information block databases may contain references to each other in order to facilitate analysis or promote consistency between the databases. For example, an inventory database may have, for each entry, a reference to a transaction in a transaction database explaining which transaction resulted in the adding of the item to the inventory. Or, the state of a particular object in a state database may link to the object in the inventory database, so that if an object becomes broken, it may be removed or changed in the inventory database. It should thus also be understood that when one database is changed by the input of new information in the system, the links between databases may inform the method that other databases require changes as well.

It should be understood that an entry in any information block database may sometimes have empty columns, and that the method may be capable of recognizing the meaning of an empty column as being unknown.

It should be clear that the more specialized information block databases may be tailored to the particular client or application. For example, a client using the current method for keeping track of a soccer league may have a specialised information block database that keeps only player information, and another for game information, and another for referee information.

Having more specialized information block databases may be useful for a number of reasons, chiefly among them the ability to quickly review relevant forms of information without needing to read through the entirety of all information blocks, which may number in the thousands, millions or even billions. For example, for answering queries about how many functional pumps a company has, it would be much quicker to scan the inventory database for a number of pumps than to scan the entire general information block database.

In some embodiments, there may also be a database that keeps the information blocks of prior queries, contributions, commands and/or dialogues as well as the past output provided by the method. This may be useful for keeping track of prior questions for traceability purposes, or for reusing certain answers for substantially duplicate questions and thus preventing the method from needing to perform the same analysis multiple times.

Thus, in some embodiments, the databases may have information about what type of information they contain such that the method knows whether or not to consult each database. In some embodiments, the method may only consult certain databases.

The method may then perform a validation of the block hierarchy and content 38. Similar to the validation performed at step 30, this validation is important in case new information gleaned from later iterations (e.g., a new information block) changes how the method would have treated an information block. If there are any changes to be made in light of new information, the databases can be updated with the corrected information block.

The method may then determine whether the end of the text has been reached 40. If the end of the text has not been reached, it will begin a new iteration from step 22 and continue the text analysis on the text that follows.

It is important to note that the method described above is just one potential embodiment. In various embodiments, various steps 20 to 40 may be rearranged or interconnected, or may be configured to call back to each other, or reordered to streamline the method. For example, step 24 may be configured to receive information from already categorized terms that are already in information blocks. In another example, if the first term of an input text is ambiguous (i.e., the category association table cannot confidently assign the correct category), the method may assign a hypothetical category to the term and move on in the method, and then return to steps 24 to categorize the ambiguous term after more words have been categorized so that it can categorize the ambiguous term with more confidence. In another example, the method may determine as it iterates over every term that some terms are ambiguous or contradictory, and may use this information to initiate a review of the terms, categories, blocks and block attributes that may be contradictory to ascertain if any errors could have been made, and if necessary, to repeat the whole analysis (assigning new categories, organizing new expressions, making new blocks, etc.). The repeated analysis may have access to the information block database to provide further context to the analysis, to minimize the chance of erroneously assigning categories, blocks and attributes.

In some embodiments, the method may be altered or optimized without affecting the overall structure of the method. For example, if computational load is an issue, various steps of the method may be streamlined for improved efficiency. For example, the category lexicon(s) used in step 24 may be extremely large if they encompasses all possible categories for all possible words, so in some embodiments, it may be useful to restrict it to a particular language, or to a particular domain (e.g., using only words and categories common to a particular domain, such as electrical engineering). This may substantially reduce the size of the category lexicon(s) and thus reduce computational load of matching every term to categories in the lexicon(s). Similarly, the category association table may be restricted to a particular domain.

It will be appreciated that the choice of attributes and the choice of term categories may be context-specific, meaning that the designer of the text analysis system selects the term categories and the block attributes. Some embodiments of the method may require, for example, a tailored list of categories and attributes. However, generally, there will at minimum be a category database containing the categories of all common words in a language, and this category database may not change from one context to another. However, more specialized category databases (e.g., scientific names of all living species) may not be necessary to include for, e.g., a mining operation. Thus, the number of categories that a word can be (which is relatively small compared to the number of words) is generally unchanged between contexts-rather, it is the number of word entries that changes. For example, a company with specific internal terms may wish to implement the method on their documentation using a custom category lexicon, category association table or list of attributes that recognize internal terms or processes or are configured to be compatible with existing internal applications.

It should also be understood that some information may exist in the information block databases prior to the beginning of the method. For example, a user who runs a construction site may find it useful to populate one or more information block databases (e.g., an inventory database) with all the equipment currently on the construction site, so that the method can directly understand references to that equipment, or answer questions about inventory without needing to receive information in the text about the presence of each piece of equipment. Additionally, many implementations of the method may include receiving not one, but many individual texts, for example, receiving reports from various employees of a construction company about the progress of the work or the state of equipment. Thus, the step of receiving a text 20 may happen after a number of information block databases are already populated.

The more information that exists within the databases, the greater the ability of the method to make inferences and to perform text analysis. Thus, it may be desirable to populate the databases with as much relevant information as possible. For example, if a class of water is knocked over, the method may be able to alert a user of a potential spill if the databases are populated with knowledge that water is a liquid, that spills occur when the container of a liquid is knocked over, and that spills are undesirable and should be alerted to a user.

Although the above example may appear contrived, if a user is able to input significant amounts of information about the world and context of the method's application, the method will have a flexibility, reliability and usability that goes above all other tools for keeping track of the user's environment using text analysis. Various problems may be alerted to a user before they even manifest into a negative consequence, if the method knows which preliminary indicators may lead to said consequence.

Two additional features, which do not fit neatly in any one of steps 20 to 40 but are important to the overall method, are libraries and structured forms of information storage.

Libraries refer to data structures that contain information about a topic or theme. They are used to inform the method that certain themes or topics are present in a text, without express keywords being used to identify their presence. For example, a police report about a robbery may not necessarily contain the keywords "trespass", "crime", "criminal", "robbery", etc. For example, "The door lock was broken, and the contents of the cash were taken" does not contain explicit mention of criminal activity. However, when a user queries the text for "what crime has taken place?" we do not want the method to return "there is no crime". By using libraries, the method will be able to identify that a crime has taken place, without needing for the keyword "crime" to be present in the text.

For example, there may be a library about the topic of "crime". Libraries may be a hierarchical structure, which starts with the general topic (e.g., "crime") which is subdivided into more and more specialized keywords (e.g., "conventional crime", subdivided into "robbery", itself subdivided into "stealing"). Each keyword may then have a list of standardized observations that can be cross-referenced with information about a text (terms, expressions, blocks of information) to determine whether the text implicitly discusses the keyword. For example, for stealing, several standardized observations may be: "Take [Something] Without the permission Of [Someone]", "Take [Something] Without the knowledge Of [Someone]", "Give [Something] To [Someone] By force", etc. These observations are built to be easily compared with blocks of information. If one or more observations are found to correlate with information blocks, then one or more information block databases may be populated with information blocks that expressly identifies the keyword (e.g., "stealing") in the context of the text.

Multiple libraries may be used to enrich the method's ability to organize or answer queries about a text.

Structured forms of information are also used to enrich the method's ability to organize or answer questions about a text. They are predetermined data structures which can be populated with information about an input text. The structure of the data structures may allow the method to determine one or more inferences, or merely organize data in a more logical way.

For example, imagine that there is an issue in a construction site. An engineer might input to the method the following report: "The circuit breaker refuses to open because the motor didn't build up the pressure. I replace the circuit board and everything is ok now". After going through steps 20 to 40, the information blocks created from the report may additionally be arranged in a hierarchical data structure which follows the cause-effect chain of events. The parent information block may thus be that the circuit braker refuses to open. The child block may then be that the motor doesn't build up pressure. The child block of that child block may be that the motor refuses to start (although, as will be seen below, this block is faulty and will be corrected). Thus, the method can follow the cause-effect chain of different incidents to answer queries or make inferences about the incidents.

The data structures may undergo a check for internal consistency or coherency. For example, in some situations, if the cause-effect chain is empty of faulty, the program may alert a user to an inconsistency. The example above contains such an inconsistency: the motor is not the item that creates pressure-rather, it should be the compressor that creates pressure. The method would be aware of this because it would have an empty place in the cause-effect chain where the information block containing the compressor keyword should be. Thus, the method would be aware that there is some information that is faulty or missing and may request the operator to correct the information. The corrected information may be that the compressor did not build up pressure.

In a further example, imagine that the worker who is reporting the situation did not explicitly state what was done to remedy the situation. By having the cause-effect hierarchy, and by knowing which part of the hierarchy caused the issue in the first place, the method can infer which part(s) of the system would need to be replaced or fixed to ensure the system is running once more, and thus create information blocks about that inference.

Data structures may function by being populated with keywords. The keywords would act as indicators of what kinds of information blocks should be used to populate the structures. For example, in a pre-determined data structure that describes the cause-effect chain of a circuit breaker refusing to open, the parent block would have a keyword "circuit breaker", and the child block would have a keyword for one of the reasons that a circuit breaker would not open (e.g., "compressor"). These keywords would act as hooks, capturing relevant information blocks in the right places in the data structures as the blocks are generated from a text.

Data structures may be informed by pre-determined rules. An operator or developer may develop a number of data structures to be installed with the method. These data structures can be more general or may be context-dependent. The example above is an example of a context-dependent data structure, used to ensure that the circuit breaker is functioning properly, and if not, to explore what is the root cause of the issue. It should be understood that a number of structures, not merely hierarchical, can be useful for organizing different information blocks generated from a text.

In some embodiments, there may also be provided one or more tables with corrective actions or recommendations to be taken following the identification of an issue.

Data structures may be particularly useful for answering queries that require inferences such as statements as to the cause-effect of certain issues in an environment. For example, to answer a question "why did the circuit breaker malfunction", the method may start at the parent block of the data structure containing the information block that the circuit breaker refuses to open, and then go down the hierarchy of information blocks until it reaches the root block of the malfunction. Or, in another example, Although not shown in FIG. 2, it should also be understood that in some embodiments, user settings inputted by a user may play an important role in the execution of the method. User settings may inform which text inputs to use for the method, how far within a document to select terms, how to categorize certain terms, how large a category lexicon or category association table to use, which block attributes to use, how to organize the blocks in the database, etc. It will be appreciated by one skilled in the art that the method can accommodate these variations.

Throughout the method of FIG. 2, additional verification or validations steps may be performed at any time to improve the accuracy of the method (e.g., verifying term category assignment based on adjacent categories, verifying term separation, etc.). This may cause certain steps to repeat, or certain steps to lead to be done out of order. The steps in FIG. 2 are on exemplary order. The verification steps are especially useful for reducing potential errors, especially since the analysis of later terms/categories/expressions/blocks may be done with reference to earlier analyzed terms/categories/expressions/blocks.

Additionally, the method may at any point receive input from a user, or request input from a user, to customize the method to fit the goals of the user or to alert the user to issues or uncertainties that arise during the functioning of the method. This may allow the user to know what the limits of the method are (e.g., if portion of the text could not be organized into information blocks, for some reason) or allow a user to ensure that the method is performing correctly.

As will be seen in the remaining Figures, the information blocks and information block attributes in the database are suitably structured, annotated data that can easily be searched or compared to other information. Thus, the database may be queried by a query, which is essentially a question inputted by the user. The query may undergo steps 20 to 40 to become suitably structured, annotated data, which can then be used to search the database. The query may be in a natural language form (e.g., "what is Bill's emotional_state?"), or in a less complicated form such as a Boolean search (e.g., "Bill AND emotional_state"), or may be some other form of input.

Once a given text has been distilled into information blocks that are stored in information block databases, which may be the suitably structure data recognizable by a computer, a computer may perform another important aspect of the current invention: it may inspect the information block databases to create inferences about the information. For example, state databases and inventory databases may be populated using the information block contents. An inference generally refers to a piece of information not explicitly contained within the original text. An inference can include observations, facts, data analysis, statistics, etc. An inference may concern information blocks in their raw form, or may concern information block databases.

For example, if after a day of work, a computer receives a report that a particular piece of gear has been turned off, but in the state database the piece of gear is already turned off, it may infer that an instance occurred where the gear was turned on but it was unreported.

In another more complex example, the computer may infer information from information blocks, such as positive or negative sentiment. For example, if a user compiles numerous reviews of their services, the method may identify words with positive connotations (e.g., "good", "satisfactory", etc.) and negative connotations (e.g., "bad", "excessive", etc.) and compiled a list of objects that are associated with positive sentiment and objects associated with negative sentiment.

In another example, a user may be able to use the suitably structure data to conduct surveys or collect data. For example, a user may ask "how many workplace accidents have occurred in the past year", and by searching information block databases containing information about employee reports, the method may determine that 15 accidents happened in the past year.

Figure 3A:
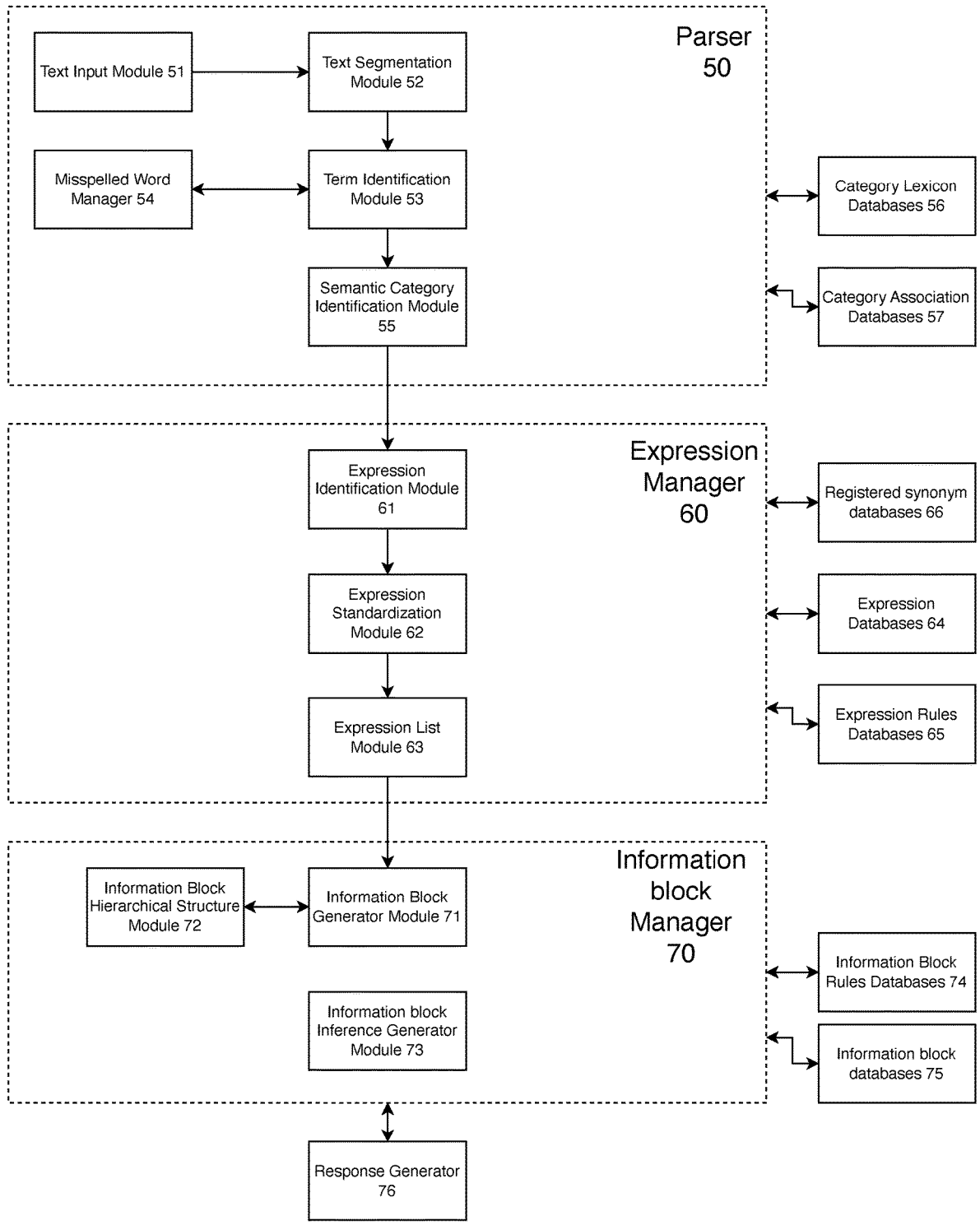
FIG. 3A is a schematic block diagram of software modules performing text analysis and query/contribution response extraction in one embodiment.

FIG. 3A is a schematic block diagram of software modules performing text analysis and query/contribution response extraction in one embodiment. The software modules may run on a conventional computer device such as the one shown in FIG. 1. The modules may be separated into three organizational groups: the text parser 50, the expression manager 60, and the information block manager 70. The elements connected to the organizational groups (for example, category lexicon databases 56) may be connected to any and all of the elements within the organizational group (so, any and all elements 51 to 55).

In the text parser 50, there may be an input module 51 for receiving an input text. The text input module 51 may be connected to a text segmentation module 52, which may separate the text into individual words. TA term identification module 53 may receive individual terms from the text segmentation module 52, identify possibly misspelled terms with the aid of a misspelled word manager 54, and then identify all possible categories of a given term obtained from one or more category lexicon databases 56. The term identification module 53 may then send the terms with all potential categories to a semantic category identification module 55, which in coordination with one or more category association databases 57, may determine which category is most likely to be correct and assign it to the term.

In the expression manager 60, the expression identification module 61 may receive categorized terms and determine, using expression databases 64 and expression rules databases 65, whether the categorized terms should be grouped into an expression. The expression standardization module 62 may then receive expressions and terms that are not part of an expression and determine, in coordination with one or more registered synonym databases 66, whether the term or expression is referring to an already established object under another name, and if so, correct the term or expression to use the standardized term or expression. The expression list module 63 may then receive the standardized terms and expressions and determine, in coordination with expression rules databases 65, whether an expression needs to be separated or expanded into multiple expressions.

Building a comprehensive synonym dictionary can be an important task for Natural language understanding and processing. Traditional synonym dictionaries often present challenges, particularly when handling situations like missing synonyms and classes to words or references to related words.

In a conventional dictionary structure, keywords may be associated with their synonyms and antonyms. However, certain scenarios, as exemplified by the table below, can complicate the understanding of synonyms. Addressing these complexities can be important for accurate language comprehension and communication. The approach in the present example involves refining the structure and expanding the scope of synonym assignment to build a more user-friendly synonym database.

---

KEY: Bound \N\;
SYN: Limit, boundary, enclosure, confine, border;
ANT: [See BORDER] .;
=;
KEY: Bound \V\;
SYN: Confine, limit, circumscribe, terminate, restrict, restrain;
ANT: Enlarge, extend, open, spread out.;
=;
KEY: Bound \V\;
SYN: To leap, jump, frisk, spring, skip;
ANT: Hobble, limp, crawl, creep .;
=;
KEY: Boundary, [See BOUND].;
=;

---

When encountering instances where a keyword lacks direct synonyms but references another word in brackets, such as "Boundary" referring to [Bound] in the table above, the referenced word ("Bound") can be analyzed to extract its synonyms. These synonyms are then attributed to the original keyword ("Boundary") as well, effectively enriching its synonym pool. This approach can ensure that keywords are not left with incomplete or insufficient synonym information. So, in this example, there is boundary as a keyword and bound and its synonyms as synonyms to boundary.

This approach can extend to the incorporation of antonyms. Just as keywords can be enriched with additional synonyms, relevant antonyms can also be added to the keyword's profile. This comprehensive approach aids in providing users with a more complete understanding of a word's various contexts and meanings.

The traditional dictionary may, more often than not, lack information about a word's class, such as whether it is a verb, noun, or adjective, as can be seen in the table above only\v\ or \n\ is assigned to different keywords and some are totally left blank. Recognizing this limitation, a "Class" column can be introduced in the synonym database. This classification helps users identify the specific context in which a word is used.

In instances where keywords reference other words, denoted by [See XXX], a clear linkage can be ensured between related terms. A "Reference" column can be introduced to highlight such connections. This reference-based approach can ensure that users can seamlessly navigate between keywords and their related terms, fostering a more holistic understanding of language nuances.

For example, consider the keyword "boundary," which is referred to the word "[Bound]" within the table. In the synonym dictionary, a "Synonym Reference" column can be introduced to accommodate such references. Similarly, the handling of references can extend to antonyms as well. When encountering scenarios like the keyword in the table, "Bound \n\ [See BORDER]," where the antonym references another term, an "Antonym Reference" column dedicated to capturing these links can be introduced.

In instances where a specific class is attributed to a reference, an additional column called "Reference Synonym Class" can be introduced. This strategic addition can safeguard against the loss of valuable information from the traditional sources especially where class attribute is missing to a reference. This column may become especially pertinent when encountering references like "[See XXX] \VI," ensuring the accurate categorization of referenced terms.

Upon close examination of one dictionary, a limitation was identified-only around 8000 synonyms were documented. To overcome this constraint, a thorough reassessment was performed. Each term was meticulously cross-referenced to determine whether it was a synonym or an antonym and its presence was cross-verified. This diligent process allowed to significantly expand the synonym list. New keywords alongside their synonyms were carefully incorporated, resulting in nearly doubling the size of the synonym dictionary. Additionally, missing synonyms were filled in by establishing connections between keywords and other relevant synonyms.

Another issue arose in the dictionary when references pointed to entirely new keywords, often as antonyms. For instance, the keyword "Misunderstanding" was accompanied by a reference to "[See Understanding]." This was confusing. To fix this, a special code was created that could spot certain patterns in words. For instance, if the first three letters of a word repeated somewhere else, like "MIS," it may be used to show if the words were related in meaning. If they were related, it meant one was the opposite (antonym) of the other. If not, they were likely similar (synonyms).

For example, the word "Misunderstanding." can be broken into two parts: "Mis-Understanding." The "Mis" part is followed by a word, like "Understanding," which has the opposite meaning. So, this tells us that "Misunderstanding" and "Understanding" are opposite in meaning.

Now, consider "Mistake." If broken into "Mis-Take," the "Mis" part is followed by "Take," which is a completely different word. If that is referred to another word in the traditional dictionary, e.g. "Fault," it means they have a similar meaning, like synonyms.

Let's consider a scenario where a keyword, "XYZ," is within the synonym dictionary. When utilizing the example dictionary, there are three potential classes that "XYZ" could belong to: Adjective, Adverb, and Noun. Notably, for the Adjective and Adverb classes, a single category is associated with each class. However, the Noun class can be assigned to any one of the 17 categories found in the example dictionary.

Assuming that there are specified four distinct categories for the "XYZ" keyword. To illustrate this concept, here is a representation, Table 1.1, of how it would be structured:

TABLE 1.1

| KW: 'XYZ' | |
| --- | --- |
| KW: 'XYZ' | Class: Adj. |
| KW Class: Adj. | KW Cat.: A |
| KW: 'XYZ' | Class: Adv. |
| KW Class: Adv. | KW Cat.: B |
| KW: 'XYZ' | Class: Noun |
| KW Class: Noun | KW Cat.: C |
|  | KW Cat.: D |
|  | KW Cat.: E |
|  | KW Cat.: F |

In the provided example above, both Adverb and Adjective classes have one category each assigned. The Noun class, on the other hand, encompasses four categories, resulting in a total of six categories.

From the synonym dictionary, as illustrated in table 1.2, there are 12 keywords assigned to keyword XYZ:

TABLE 1.2

KW: 'XYZ'

Synonyms: KW1, KW2, KW3, KW4, KW5, KW6, KW7, KW8, KW9, KW10, KW11, KW12

Moreover, when referring to the example synonym dictionary, there are associated categories for every keyword listed. For example, keyword 1 is assigned categories C, E & B; keyword 2 only has D, keyword 3 only has A, Keyword 4 has B or D so on and so forth. The table 1.3 outlines how various keywords are linked to specific categories within the context of the synonym dictionary:

TABLE 1.3

KW: 'XYZ'

Synonyms: KW1, KWZ, KW3, KW4, KW5, KW6, KW7, KW8, KW9, KW10, KW11, KW12
KW1 Cat.:C KW1 Cat.: E KW1 Cat.: B
KW2 Cat.: D
KW3 Cat.: A
KW4 Cat.: B KW4 Cat.: D
KW5 Cat.: B
KW6 Cat.: E
KW7 Cat.: D KW7 Cat.: A KW7 Cat.: C KW7 Cat.: E
KW7 Cat.: F
KW8 Cat.: F
KW9 Cat.: F KW9 Cat.: B KW9 Cat.: D
KW10 Cat.; C
KW11 Cat.: C KW11 Cat.: A
KW12 Cat.: F The next step can involve simplifying table 1.3 to combine all the categories for each keyword in table 1.4. In this compiled list, each keyword is presented, followed by a set of parentheses indicating the possible categories. For instance, we begin by listing keyword 1, followed by the associated categories in parentheses (c, e, b). This pattern is repeated for keywords 2, 3, 4, and so forth, ensuring a structured representation.

TABLE 1.4

KW: 'XYZ'

Synonyms: KW1, KW2, KW3, KW4, KW5, KW6, KW7, KW8, KW9, KW10, KW12, KW12
KW1(C, E, B)
KW2(D)
KW3(A)
KW4(B, D)
KW5(8)
KW6(E)
KW7(D, A, C, E, F)
KW8(F)
KW9(F, B, D)
KW10(C)
KW11(C, A)
KW12(F)

Table 1.4 is only a simplified version of table 1.3.

Let's examine the information available in table 1.1 from the example dictionary regarding the keyword 'XYZ.' By merging that data with the contents of table 1.4, table 1.5 is obtained. This table presents the keyword 'XYZ' alongside its associated six categories. Within the same table, the synonym list as well as the possible categories enclosed in parentheses for each keyword mentioned in table 1.4 are integrated:

TABLE 1.5

| KW: 'XYZ' | |
| --- | --- |
| KW: 'XYZ' | Class: Adj. |
| KW Class: Adj. | KW Cat.: A |
| KW: 'XYZ' | Class: Adv. |
| KW Class: Adv. | KW Cat.: B |
| KW: 'XYZ' | Class: Noun |
| KW Class: Noun | KW Cat.: C |

TABLE 1.5-continued

| KW: 'XYZ' |
|---|
| KW Cat.: D |
| KW Cat.: E |
| KW Cat.: F |
| Synonyms |
| KW1(C, E, B), KW2(D), KW3(A), KW4(B, D), |
| KW5(B), KW6(E), KW7(D, A, C, E, F), KW8(F), |
| KW9(F, B, D), KW10(C), KW11(C, A), KW12(F) |

Now, considering the keyword 'XYZ' in category A, only the keywords that are possible categories of A may be chosen. This selection is illustrated in table 1.6, where the keywords 3, 7, and 11 are possible categories of A:

TABLE 1.6

| KW; 'XYZ' | |
|---|---|
| KW: 'XYZ' | Class: Adj. |
| KW Class: Adj. | KW Cat.: A |
| KW: 'XYZ' | Class: Adv. |
| KW Class: Adv. | KW Cat.: B |
| KW: 'XYZ' | Class: Noun |
| KW Class: Noun | KW Cat.: C |
| | KW Cat.: D |
| | KW Cat.: E |
| | KW Cat.: F |
| Synonyms + Cat.: A | |
| KW3(A), KW7(A), KW11(A) | |

Similarly, examining the keyword 'XYZ' in category B, only the keywords that are possible categories of B can be chosen. This selection is illustrated in table 1.7, where the keywords 1, 4, 5 and 9 are possible categories of B:

TABLE 1.7

| KW: 'XYZ' | | |
|---|---|---|
| KW: 'XYZ' | Class: Adj. | |
| KW Class: Adj. | KW Cat.: A | KW3(A), KW7(A), KW11(A) |
| KW:'XYZ' | Class: Adv. | |
| KW Class: Adv. | KW Cat.: B | |
| KW: 'XYZ' | Class: Noun | |
| KW Class: Noun | KW Cat.: C | |
| | KW Cat.: D | |
| | KW Cat.: E | |
| | KW Cat.: F | |
| Synonyms + Cat.: B | | |
| KW1(B), KW4(B),KW5(B), KW9(B) | | |

Likewise, examining the keyword 'XYZ' in category C, only the keywords that are possible categories of C can be chosen. This selection is illustrated in table 1.8, where the keywords 1, 7, 10 and 11 are possible categories of C:

TABLE 1.8

| KW: 'XYZ' | | |
|---|---|---|
| KW: 'XYZ' | Class: Adj. | |
| KW Class: Adj. | KW Cat.: A | KW3(A), KW7(A), KW11(A) |
| XW: 'XYZ' | Class: Adv. | |
| KW Class: Adv. | KW Cat.: B | KW1(B), KW4(B), KW5(B), KW9(B) |
| KW: 'XYZ' | Class: Noun | |
| KW Class: Noun | KW Cat.: C | |
| | KW Cat.: D | |
| | KW Cat.: E | |
| | KW Cat.: F | |
| Synonyms + Cat.: C | | |
| KW1(C), KW7(C), KW10(C), KW11(C) | | |

Equally, examining the keyword 'XYZ' in category D, only the keywords that are possible categories of D can be chosen. This selection is illustrated in table 1.9, where the keywords 2, 4, 7 and 9 are possible categories of D:

TABLE 1.9

| KW: 'XYZ' | | |
|---|---|---|
| XW: 'XYZ' | Class: Adj. | |
| KW Class: Adj. | KW Cat.: A | KW3(A), KW7(A), KW11(A) |
| KW: 'XYZ' | Class: Adv. | |
| KW Class: Adv. | KW Cat.: B | KW1(B), KW4(B), KW5(B), KW9(B) |
| KW: 'XYZ' | Class: Noun | |
| KW Class: Noun | KW Cat.: C | KW1(C), KW7(C), KW10(C), KW11(C) |
| | KW Cat.: D | |
| | KW Cat.: E | |
| | KW Cat.: F | |
| Synonyms + Cat.: D | | |
| KW2(D), KW4(D), KW7(D), KW9(D) | | |

Similarly, examining the keyword 'XYZ' in category E, only the keywords that are possible categories of E can be chosen. This selection is illustrated in table 1.10, where the keywords 1, 6 and 7 are possible categories of E:

TABLE 1.10

| KW: 'XYZ' | | |
|---|---|---|
| KW: 'XYZ' | Class: Adj. | |
| KW Class: Adj. | KW Cat.: A | KW3(A), KW7(A), KW11(A) |
| KW: 'XYZ' | Class: Adv. | |
| KW Class: Adv. | KW Cat.: B | KW1(B), KW4(B), KW5(B), KW9(B) |
| KW: 'XYZ' | Class: Noun | |
| KW Class: Nouns | KW Cat.: C | KW1(C), KW7(C), KW10(C), KW11(C) |
| | KW Cat.: D | KW2(D), KW4(D), KW7(D), KW9(D) |
| | KW Cat.: E | |
| | KW Cat.: F | |
| Synonyms + Cat.: E | | |
| KW1(E), KW6(E), KW7(E) | | |

Similarly, examining the keyword 'XYZ' in category F, only the keywords that are possible categories of F will be chosen. This selection is illustrated in table 1.11, where the keywords 7, 8, 9 and 12 are possible categories of F:

TABLE 1.11

| KW: 'XYZ' | | |
|---|---|---|
| KW: 'XYZ' | Class: Adj. | |
| KW Class: Adj. | KW Cat.: A | KW3(A), KW7(A), KW11(A) |
| KW: 'XYZ' | Class: Adv. | |
| KW Class: Adv. | KW Cat.: B | KW1(B), KW4(B), KW5(B), KW9(B) |
| KW: 'XYZ' | Class: Noun | |
| KW Class: Noun | KW Cat.: C | KW1(C), KW7(C), KW10(C), KW11(C) |
| | KW Cat.: D | KW2(D), KW4(D), KW7(D), KW9(D) |
| | KW Cat.: E | KW1(E), KW6(E), KW7(E) |
| | KW Cat.: F | |
| Synonyms + Cat.: F | | |
| KW7(F), KW8(F), KW9(F), KW12(F) | | |

The combination of the tables from table 1.6 to 1.11 would look like table 1.12 which completes the list for the example synonym dictionary.

TABLE 1.12

| KW: 'XYZ' | | |
|---|---|---|
| KW: 'XYZ' | Class: Adj. | |
| KW Class: Adj. | KW Cat.: A | KW3(A), KW7(A), KW11(A) |
| KW: 'XYZ' | Class: Adv. | |

TABLE 1.12-continued

KW: 'XYZ'

| | | |
|---|---|---|
| KW Class: Adv.<br>KW: 'XYZ' | KW Cat.: B<br>Class: Noun | KW1(B), KW4(B), KW5(B), KW9(B) |
| KW Class: Noun | KW Cat.: C | KW1(C), KW7(C), KW10(C), KW11(C) |
| KW Class: Noun | KW Cat.: D | KW2(D), KW4(D), KW7(D), KW9(D) |
| KW Class: Noun | KW Cat.: E | KW1(E), KW6(E), KW7(E) |
| KW Class: Noun | KW Cat.: F | KW7(F), KW8(F), KW9(F), KW12(F) |

The result in this example is table 1.13. As can be seen, the keyword 'XYZ' is not singular in the database; instead, it encompasses six distinct sets of values, for six different categories (A, B, C, D, E, & F). Within these categories, 'XYZ' is accompanied by a specific array of keywords that can act as substitutes. Remarkably, regardless of the substitute used, the underlying meaning remains consistent. For instance, replacing 'XYZ' with keywords 3, 7, or 11, it maintains the meaning of category A. Similarly, keywords 1, 4, 5, and 9 uphold the meaning of category B, and this pattern extends to the other categories as well.

TABLE 1.13

| | Class | Category | Synonyms |
|---|---|---|---|
| KW: 'XYZ' | KW Class: Adj. | KW Cat.: A | KW3(A), KW7(A), KW11(A) |
| KW: 'XYZ' | KW Class: Adv. | KW Cat.: B | KW1(B), KW4(B), KW5(B), KW9(B) |
| KW: 'XYZ' | KW Class: Noun | KW Cat.: C | KW1(C), KW7(C), KW10(C), KW11(C) |
| KW: 'XYZ' | KW Class: Noun | KW Cat.: D | KW2(D), KW4(D), KW7(D), KW9(D) |
| KW: 'XYZ' | KW Class: Noun | KW Cat.: E | KW1(E), KW6(E), KW7(E) |
| KW: 'XYZ' | KW Class: Noun | KW Cat.: F | KW(F), KW8(F), KW9(F), KW12(F) |

This representation aligns closely with the desired structure for the example synonym dictionary. The distinction lies in the fact that the codes, such as A, B, C, D, E, & F, correspond to two and three-letter keywords, which encompass both main category and sub-category codes. The ongoing process may involve crafting rules to accurately assign categories to each synonym.

For the current phase, it may be prudent to include both the main category and subcategory keyword codes in the example synonym lists. This approach enhances the precision of each keyword's meaning, ensuring a more comprehensive and refined representation.

In the information block manager, the information block generator module 71 may receive the terms and expressions from the expression manager 60 and use them to create information blocks, in coordination with one or more information block rules databases 74. The information block hierarchical structure module 72 may inform the information block generator module 71 as to how the block relate to one another, and then may be stored in one or more information block databases 75. The information block manager 70 may also have an information block inference generator module 73 for determining inferences about the information contained within the information block databases 75. The information block manager 70 may also be connected to a response generator 76 for generating responses to user queries, commands, contributions or dialog.

Figure 3B:
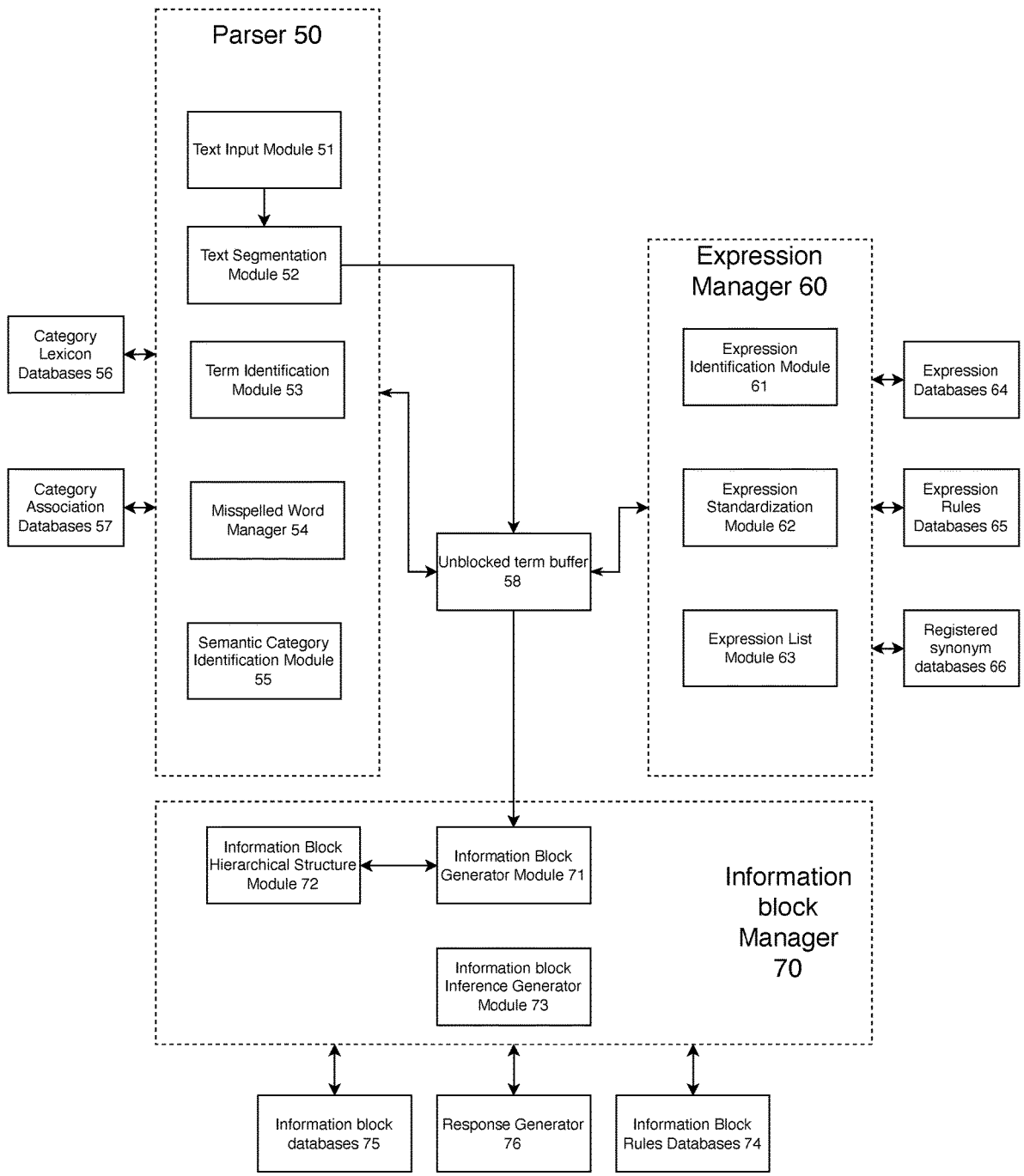
FIG. 3B is a schematic block diagram of software modules performing text analysis and query/contribution response extraction in another embodiment.

It will be appreciated by those skilled in the art that the software modules of FIG. 3A or 3B or their connections may be rearranged in different ways to provide a desired functionality. For example, as described with reference to FIG. 2, various steps of the method may be rearranged or further interconnected to repeat some steps or call back to other steps. Accordingly, the software modules in FIG. 3 may be rearranged or further interconnected to allow this to happen.

In some embodiments, there may be other software embodiments than what is shown in FIG. 3, for example, a document display module or a module configured to save the information block store on the hard drive of the computer.

FIG. 3B is a schematic block diagram of software modules performing text analysis and query/contribution response extraction in another embodiment. Most of the elements in FIG. 3B correspond to the same elements in FIG. 3A. The only difference is the presence of the unblocked term buffer 58. In this embodiment, the unblocked term buffer contains the raw text, terms, term combinations, categories, category combinations, expressions and expression combinations while the other modules perform their functions, until the information is ready to be sent to the information block generator module 71. It may be understood that the unblocked term buffer provides a location for steps 22 to 30 of FIG. 2 to occur. This may be beneficial in terms of keeping all unblocked information in one place, thus allowing the method to perform validations much more easily.

Figure 4:
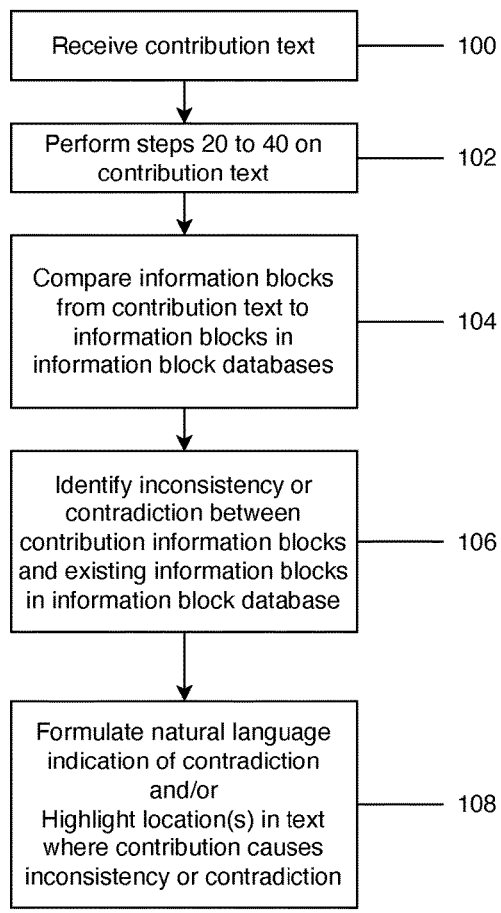
FIG. 4 is a flow chart setting out steps involved in contribution text analysis according to one embodiment.

FIG. 4 is a flow chart setting out steps involved in contribution text analysis according to one embodiment. In an ideal embodiment, the method would receive a contribution text input 100. The method would then perform steps 20 to 40 discussed with regards to FIG. 2, resulting in information blocks and block attributes. These blocks and block attributes may be compared 104 to blocks and block attributes that already exist in the state of environment or topic of text database from an original text. The method may then identify inconsistencies or contradictions between the contribution text and the original text 106, and highlight the inconsistencies to the user 108, either through natural language indications of contradiction or by highlighting the locations in the contribution text or original text which cause the inconsistency or contradiction. An example of the functionality of FIG. 4, is a writer writing a book. Their additions to the book may be checked for inconsistencies in the text that already exists. For example, a writer may rewrite an earlier chapter of the book, changing which events take place (e.g., removing an event where two characters get married). This can produce inconsistencies (e.g., in a later chapter, two characters are discussing the married couple). The method would recognize, through steps 100 to 106, that the rewritten chapter introduces inconsistencies and will provide indications to the user.

The indication of contradiction may be formulated as a natural language indication of contradiction, or natural language response formulation. This may include warnings ("Warning: possible contradiction on page X"). Sometimes, the method may provide additional details in a helpful manner ("Warning: the wedding referenced on page X does not exist"). The indication of contradiction may also merely be a notification or a pointer identifying or highlighting the areas in the text where the inconsistency or contradiction originated. The method may highlight with colours or provide a tool to quickly navigate to the highlighted section. In some embodiments, the method may offer multiple indications of contradiction, such as by highlighted to inconsistent sections while also providing natural text explaining why the highlighted section is inconsistent.

In some embodiments, it may be possible for the user to disregard indications of contradiction. Although unlikely, it is possible for the method to produce errors in understanding text. The indication of contradiction may be equipped with the option for the user to specify that the method has erred, and that the contradiction does not exist. The user may be able to provide additional details as to why the method has erred, or manually change information in the database, the blocks or the block attributes to eliminate the contradiction.

Figure 5:
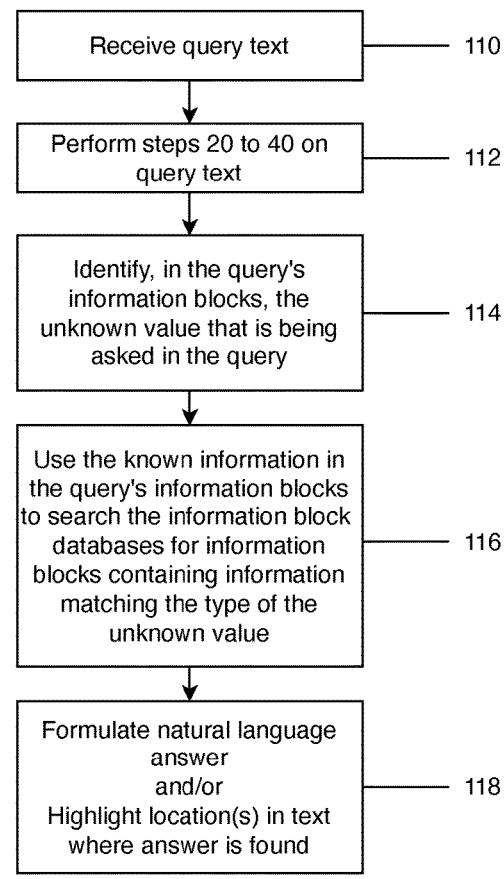
FIG. 5 is a flow chart setting out steps involved in query text analysis and response extraction according to one embodiment.

FIG. 5 is a flow chart setting out steps involved in query text analysis and response extraction according to one embodiment. The method may receive a text query 110 from a user and perform steps 20 to 40 on the text query 112 to convert the natural language of the query into information blocks and attributes of blocks. These resulting blocks and block attributes are compared to existing blocks and block attributes in a state of environment or topic of text database 114. The method may then identify matches between the query text blocks and block attributes and the database blocks and block attributes 116. The matching information may be the answer to the query and may then be presented to the user in the form of a natural language answer and/or by highlighting the location in the text that provided a match with the query.

In some embodiments, the method may also involve an unknown in the query. The matching step 116 may then involve attempting to match the known aspects of the query input with information in the database, and then determining if the matched information from the database has information of the category or block attribute type that matches the unknown in the query. For example, the query "What colour is Bill's shirt?" may cause the method to search the database for information regarding a shirt that is associated with Bill, and may search the information blocks for blocks that have information about color.

In some embodiments, if the search is unable to yield only one result, the method may provide more than one possible answer to the query. This may happen, for example, if the user inputs a query that is insufficiently precise. In this case, the method may provide all possible answers to the query, or, if the possible answers are too numerous to be displayed at once, inform the user that there are too many answers. In some embodiments, the method may identify what part of the query is imprecise or leading to too many possible answers and may ask the user to provide further specification (e.g., "Bill has multiple shirts. Which one do you want to know about?"). In some cases where there are multiple possible answers, but one answer is more likely the answer that the user is looking for, the method may preferentially present that answer over the others.

In some embodiments, each term may be associated with one or more other terms in a hierarchical relationship. This allows for certain terms to be grouped together, so that a computer may link the terms together. This facilitates a search because if the particular term in the query is not present in the databases, the method can search the databases for related terms. The term association information may be kept in a database.

In some embodiments, the method may identify the keywords of the query and create variations of the query using synonyms or related keywords. For example, if a query is "what is the name of the horse", but in fact, the animal in the text was technically a mule, it may be useful for the method to be able to query the various databases not only for "horse" but for "animal".

In some embodiments, each category of a term may be associated with a parent category and one or more child categories. For example, the 'arson' term may have a parent query of 'crime'. So, in a police report about an arsonist where a user queries the text for "Which crime was committed?", the computer may not identify 'crime' in the text, but when searching for related term 'arson', will be able to identify that arson was committed.

In some embodiments, the method may perform a step of validating the query before beginning the search for information to answer it. This may involve distilling the query to determine if the method can understand which unknown is being asked in the query, or determining of the query is self-contradictory, or determining more contextual factors such as whether the user asking the question has permission to know the answer to such a question. In some cases, such as if the query has more than one unknown being asked, the method may pre-emptively request clarification from the user before undergoing an extensive search for the answer to the query.

In some embodiments, answers to a query need not be formulated in natural language, but instead take the form of presenting a portion of the original text in which the answer is found. This can take the form of highlighting text, for example. When more than one location in the next could contain an answer, the presentation could allow the user to navigate through the locations. In this case, the query response can serve as a more advanced type of "find" function that is well known in text viewers and editors.

In some embodiments, the user may be able to notify their dissatisfaction with the answer, either because they believe it is wrong, or because it wasn't the answer to the question they had intended to ask. This may be especially useful for elderly populations, who may have difficulty formulating questions in technical ways. The method may be equipped with a tool to provide the user with alternative queries that are related to the initial query, or other strategies to aid the user in finding the information they are looking for.

In some embodiments, the method may record queries, answers, indications of satisfaction or dissatisfaction or any other information. Recording this information may be useful in providing statistical data about the functionality of the method to the user. For example, if one type of query is leading to dissatisfaction, a user or administrator may investigate that type of query to determine why the method is not performing as intended. Additionally, repeats of the same query may bypass computational effort by providing the saved answer instead of searching the database anew.

In some embodiments, the information blocks of the query may be structured into data structures much like the information blocks of the text, or the keywords of the query standardized with the existing terms in the text. This may permit the method to more easily compare information from a query with the information in the various databases.

One important type of query that may be asked frequently is the ability to summarize or reduce the length of a text to become more readable or more quickly readable. The method is capable of reducing the size of texts to only the most important information. This may be achieved by distilling the text into information blocks and determining which information blocks contain information that is not repeated or not 'fluff' (e.g., literary eloquence, jokes, etc. that do not confer strictly factual information) and reducing expressions to individual words or terms. The method may then reconstruct a shortened text from the information blocks that are deemed to be necessary, unrepeated factual information, providing a text to the user that is 10% to 50% the length of the original text, but that contains all of the information. In some embodiments, the method may be configured to evaluate which information blocks contain information important enough to remain in the reduced version of the text.

FIG. 6 is a flow chart setting out steps involved in command text analysis and response generation according to one embodiment. In this exemplary embodiment, the method may receive a command 120, and perform steps 20 to 40 on the text of the command 122. The method may then determine, from the command's information blocks, the function that the user is commanding the computer to execute 124. The method may then cause the computer to perform the commanded function 126.

In some embodiments, steps 122 or 124 may require reference to information block databases. For example, if the command is "turn the pump on", it will be necessary to consult information block databases to determine what is being meant by 'the pump'.

To be able to execute commands on a computing device, the method may require additional permissions or information. For example, the method may require an additional database containing information about available actions that the method can perform (e.g., opening a browser, opening a document, etc.) and vocabulary adapted to understanding those commands.

In some embodiments, the program may be integrated with speech-to-text functionality, allowing a person to control their computer merely by speaking.

In some embodiments, when the program is unable to accomplish the desired command, it may create a response to the user to alert the user that it was unable to accomplish a command.

In some embodiments, the method may have access to a command database containing information (e.g., a database of a multitude of scripts) about what actions to perform given the contents of a command. For example, the command database may contain information allowing the method to call upon the 'print' function of a computer or a program when a command reads 'print X'.

In some embodiments, the command function may involve the execution of one or more of a number of scripts that allow a computer to fulfill the command of the user. These scripts may provide commands to a particular computer to, for example, generate inputs to be received by other applications or external software. For example, the command "print the document" may cause the method to execute a script which generates the inputs "CTRL-P; *wait*; ENTER", the inputs necessary to print a document in Microsoft Word™. Various other scripts may accomplish more complex functions, such as filling out a user's information in a registration form or generating an answer to an email and sending that email to the correct recipients, and thus may require more complex inputs (e.g., movement of a mouse, etc.).

In some embodiments, performing the command may require information not found in the command itself. For example, the command "Schedule a follow-up appointment in six months." does not contain information about what 'six months' is, or who the appointment is for. Thus, the script executed by the command software may involve consulting one or more databases that could contain the additional information, for example a patient scheduling database which will inform the script which patient is currently being seen by the doctor and what the current day is, allowing the method to schedule a follow up appointment for that patient.

In some embodiments, the command function may be particularly useful for reducing the training time needed for employees. For example, if an organization changes the structure of an internal accounting application, it will no longer be necessary to train every employee on the new accounting application. The organization will only need to train the method (by way of scripts). The individual employees may then instruct the method with commands they are familiar with (e.g., "please log 7.5 hours of my time today") without needing to know the specifics of where to go in the new accounting application to accomplish this task manually.

FIG. 7 is a flow chart setting out steps involved in dialog text analysis and response generation according to one embodiment. In this exemplary embodiment, the method may present a challenge to a user 130. The challenge may be a question, a prompt, or merely an indication that a user should or must perform an action. The method may then receive input from the user 132 in response to the challenge. The method may perform steps 20 to 40 on the input 134. Then, the method may determine, using information from the input's information blocks, whether and how to respond to the user. The method may consult one or more databases, which may contain information blocks or pre-programmed responses or any indication of how to respond, for the purposes of determining whether and how to respond to the user.

In some embodiments, the method may be configured to require certain pieces of information from a user before proceeding to a next step. For example, on a construction site, the method may be charged with collecting reports from various workers. The method may be required, by an administrator, to receive at least a time indication of the report, the identification of the person filling out the report, and a description of the event that is being reported. Unless the method receives all of these pieces of information during a report, the method may notify the employee filling out the report that there is insufficient information provided. This may prevent the employee from submitting the report until the correct information is provided.

In some embodiments, the method may have one or more tables that indicate the amount and/or types of information that is required before the method can proceed to a new line of dialog, or to a new state. In some embodiments, the method may have particular data structures to populate with information, and the method will not proceed until the data structures are filled. For example, in a doctor's office, when asking a patient about their familial medical history, the method may be required to fill a hierarchical data structure with the patient as the central block, and the patient's ancestors (parents, grandparents, great-grandparents) as connected blocks. Until the patient provides enough information to fill the ancestors' blocks, the method may not continue.

In some embodiments, steps 132 or 134 may require reference to information block databases. For example, if the user input is "I turned the pump on", it will be necessary to consult information block databases to determine what is being meant by 'the pump'.

In some embodiments, the method may notify an administrator of non-compliant or unfinished reports.

In some embodiments, the method may be configured to respond to the user's input with another challenge. For example, this may be useful in a medical clinic, where patients may be screened for their medical history by the method of FIG. 7. A first challenge may ask the patient for their name, and a second challenge may ask a patient for their age. Thus, the method may be outfitted with one or more additional databases informing the method of how to react to certain inputs from a user during dialog functionality, which may in some cases be similar to a kind of dialog tree. For example, if the user inputs their age, the method may then ask them for their symptoms. But, if a user inputs a desire to speak to a human, the method may notify a system administrator of the need for a human to speak to the user.

The determination of how to respond to a user's input may be governed by one or more scripts. The scripts would have information about how to respond to certain inputs from users, what to do with those inputs, and whether additional information is needed from the user.

In some embodiments, the user may respond to a challenge by the method with a question. The method may then answer the question in order to help the user provide the required information.

In some embodiments, the challenges to the user may be open-ended, requiring an answer that can be of any form, or close-ended, requiring one particular answer from a limited range of possible answers. The use of close-ended answers may be useful for contexts where the administrator wishes to avoid any potential misunderstanding between the user and the computer implementing the method.

In some embodiments, the different functionalities of query, contribution, command and dialog may be combined. For example, in a context of an employee filling out reports, the system may be configured to only accept the report once certain pieces of information are provided (dialog). However, it may then take the report as a contribution and determine whether it introduces any inconsistencies or contradictions in the information block databases. If inconsistencies are found, an administrator may be notified, or the employee may be asked to explain the inconsistencies.

It is understood that the embodiments described (query, command, contribution, dialog) are illustrative, non-limiting descriptions of potential implementations of the method, and that other implementations or variations may be apparent to one skilled in the art.

Figures 8, 9:
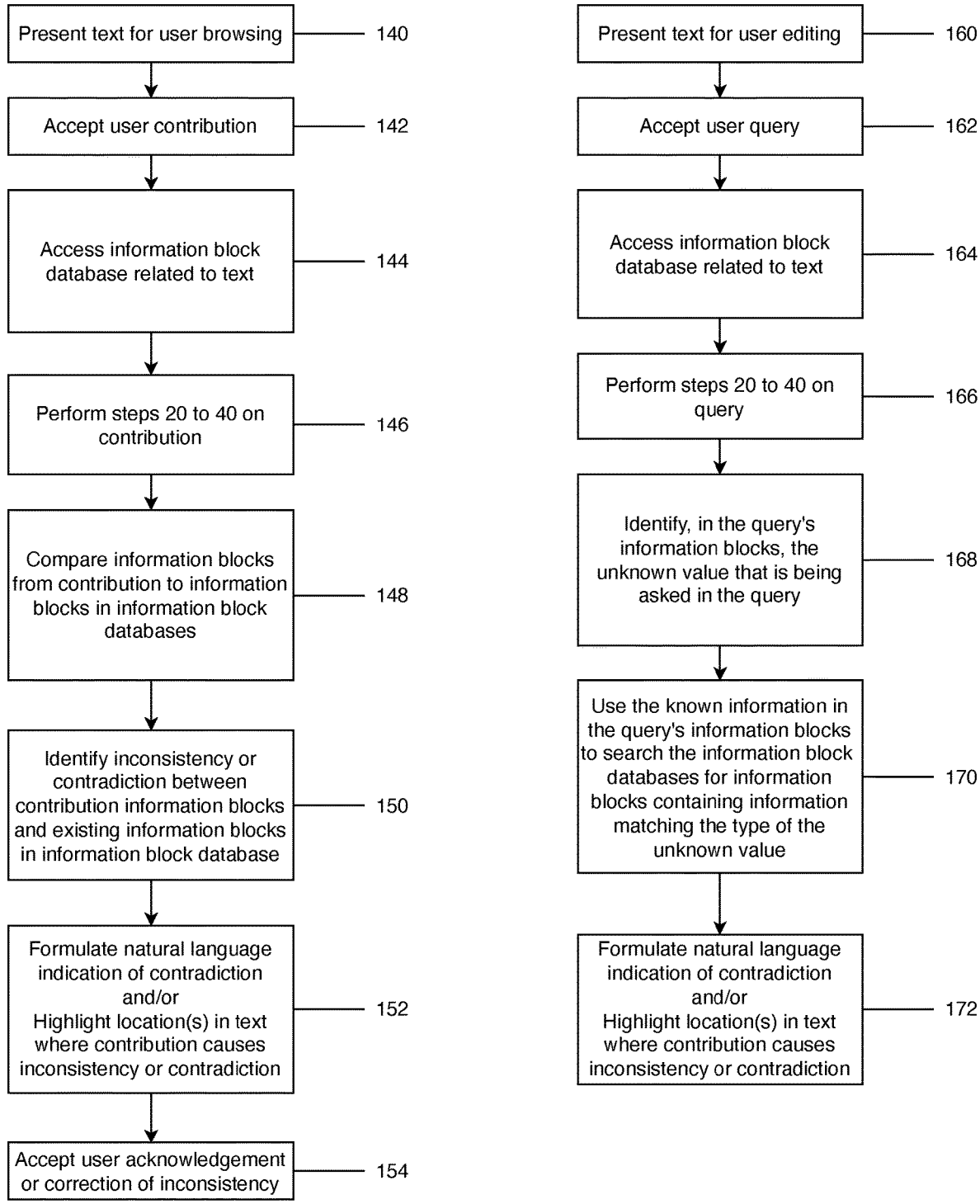
FIG. 8 is a flow chart setting out steps involved in presenting a document to a user for editing or contribution while accepting a user contribution text to help the user make valid contributions to the document by indicating when a contribution is inconsistent with or contradicts what is already in the document according to one embodiment.
FIG. 9 is a flow chart setting out steps involved in presenting a document to a user while accepting a user query to help the user find answers within the document according to one embodiment.

The methods described above may easily be combined or integrated with document viewers or text editors for added convenience for the user. FIG. 8 is a flow chart setting out steps involved in presenting a document to a user for editing or contribution while accepting a user contribution text to help the user make valid contributions to the document by indicating when a contribution is inconsistent with or contradicts what is already in the document according to one embodiment, with or contradicts what is already in the document according to one embodiment. The method may involve presenting a text for user edition 140, such as via a text editor like Microsoft Word™, accepting a user contribution text 142, such as an input sentence to be added to the document, accessing information block database related to the document 144, performing steps 20 to 40 on the contribution text 146, comparing information blocks from contribution to information blocks in information block databases 148, identifying inconsistency or contradiction between contribution information blocks and existing information blocks in information block database 150, formulating a natural language indication of contradiction and/or highlighting to the user the location of the inconsistencies or contradictions within the document 152 and accepting user corrections of the text in the document and or/contribution text 154.

It will be appreciated that text analysis can at times fail to correctly interpret a text due to limitations of the framework of categories and the category association table. If a contributor finds that the text analyser is incorrect in finding an inconsistency between the contribution and the analysis of the prior text, the text analysis engine may permit the user to correct the analysis of the prior text. A text editor may display the text analysis of the text in a manner that allows the user to review that the text analysis is accurate, and possibly offer correction in the case of incorrect interpretations or resolution of ambiguous text.

FIG. 9 is a flow chart setting out steps involved in presenting a document to a user while accepting a user query to help the user find answers within the document according to one embodiment. The method may involve presenting a text for user browsing 160, accepting a user query 162 about the document, accessing one or more information block databases related to the presented text 164, performing steps 20 to 40 on the query text 166, identifying, in the query's information blocks, the unknown value that is being asked in the query 168, using the known information in the query's information blocks to search the information block databases for information blocks containing information matching the type of the unknown value 170, and formulating a natural language answer to the query text and/or highlighting to the user the locations in the text where the matches are found 172 that is visible within the text-editing software.

FIG. 10 is a flow chart setting out steps involved in presenting a document to a user while accepting a user command. The method may involve presenting a text for user browsing 180, accepting a user command 182, accessing an information block database about the text and a database about possible program commands 184, performing steps 20 to 40 on the command 186, determining, from the command's information blocks, the functions to execute 188 and performing the commanded functions 190. The method may also involve a step of checking whether the program has authority to accomplish the command, or confirming with the user before executing the function.

In some embodiments, steps 186 or 188 may require reference to information block databases. For example, if the command is "turn the pump on", it will be necessary to consult information block databases to determine what is being meant by 'the pump'.

FIG. 11 is a flow chart setting out steps involved in presenting a document to a user while engaging in dialog with the user. The method may involve presenting a text for user editing 200, presenting a challenge to the user 202, receiving a user input 204, accessing one or more information block databases related to the text or the context of the challenge 206, performing steps 20 to 40 on the query 208, and determining, using information from the input's information blocks, whether and how to respond to the user 210. A script can be used to initiate the dialog with a user. The script may take the form of a questionnaire. A user's answers may be used as contribution text if the user has information that is of value to the text. If a user's answer is inconsistent with the text, the user may be questioned about the inconsistency so that the text's accuracy can be improved. Alternatively, the inconsistency may be flagged for an operator, supervisor or other user to investigate to perform or approve the correction. If a user answers with a question, the answer may be provided using the knowledge of the text.

Figure 12:
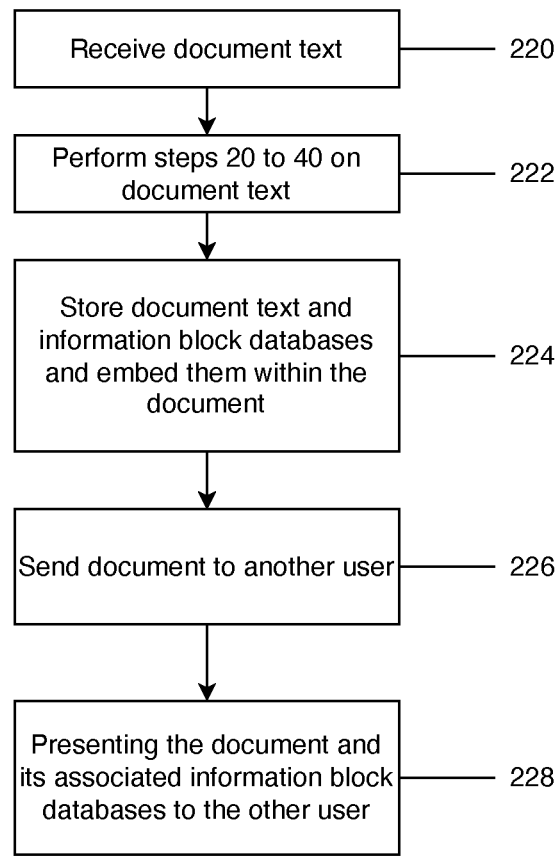
FIG. 12 is a flow chart setting out steps involved in preparing a document for a user by embedding the results of text analysis so that the user can provide a query to help the user find answers within the document according to one embodiment.

FIG. 12 is a flow chart setting out steps involved in preparing a document for a user by embedding the results of text analysis so that the user can provide a query to help the user find answers within the document according to one embodiment. The method may involve receiving a document text 220, performing steps 20 to 40 on the document text 222, storing the document text information block databases and embedding them within the document 224, sending the document to another user 226, and presenting the document and the associated information block databases to the other user 228.

In some embodiments, the method may be affected by a number of user settings configurable by the user. For example, a user may instruct the method to use the broadest possible category lexicon, accepting the advantage of better precision of term categorization in exchanged for the cost of a higher computational load, or a user may inform the method that if a query inputting by the user results in over 50 possible answers, to not show the answers and merely request more precision from the user. It is also useful for the user to be able to define terms manually if needed by editing the category lexicon(s), if the user is using terms in non-conventional ways or is using new terms.

In some embodiments, the method may provide the user with access to the raw data of the blocks and block attributes stored within the information block database, allowing the user to edit erroneous assumptions made by the method. In some embodiments, the blocks, block attributes or the database may be presented in a UI so that a user may more intuitively navigate the saved information. For example, information judged more important (e.g., because the entity appears more often in the text) may be presented more centrally.

The methods described above may be useful for a number of applications. For example, the method may be paired with a text editor, and used to inform a user of inconsistencies as they type in a document, or it may allow a user who is reviewing a very long document to find answers to specific queries they have about the document without having to read through the whole text. Alternatively, the method may be used as an autocorrect, by finding inconsistencies in the use of language of a person as they type on a computer or a phone. The method may be integrated with email, scheduling or calendar applications, or between applications, informing a user of when they are suggesting plans that may conflict with existing plans. The method may be useful for professionals who communicate with a number of clients or patients every day, the method being able to keep track of which client/patient is which and informing the professional when the professional is mixing up two clients/patients by referring to the history of correspondence between the professional and the client/patient. The method may be useful for large organizations seeking to organize or synthesize information from hundreds or even thousands of documents, such as an organization offering public services which needs to keep track of its inventory and the actions of its employees. The method may be integrated not in one document but in a database of documents, such as a database containing pharmacological information about a number of medicines and may inform users about medications that are counter indicated, or provide users with a list of medicines that match a user query (e.g., "A medicine for headaches that can be taken during the day alongside antibiotics").

In some embodiments, the method may keep track of all text inputs, information blocks, queries, contributions, commands and dialog interactions in a separate database, such as for administrator review of the performance of the method.

In some embodiments, the method may be configured to provide an indication of confidence about its categorization, expression organization, information block creation, information block attribute determination, or reaction to a query, contribution, command or dialog interaction.

Certain exemplary embodiments warrant further discussion. In one exemplary embodiment, the method is configured to receive a large number of documents (e.g., reports, internal emails, emails with clients, etc.) from a client, which may be a large organization. The method may then analyze each of the documents and resolve various inconsistencies that may be present between them. Once the information is analyzed, a user would be able to easily determine information about the organization, such as the state of any of its assets, its inventory of assets, or its history of transactions. This would greatly facilitate management of the organization and greatly reduce or completely eliminate the manpower require to do manual statistics or analysis of the data contained in the large number of documents.

In another exemplary embodiment, the method may be configured to perform the natural language text analysis without performing any inferences whatsoever. Clients may in some cases request that they perform their own inferences, using their own data analysis methods. Thus, the method may in some cases be useful merely for providing the raw information blocks, or certain information block databases (e.g., an inventory database) without additional functionality.

In another exemplary embodiment, the method may be configured to analyze and organize information in a desired format for a user. Although the method may use its own rules, categories, etc. to analyze the input text, it may be able to format the resulting data in a format customized to the user, as long as the user's format is intelligible to the method. For example, during an external audit, the method may be configured to provide all information required by the audit in the format required by the auditor.

In another exemplary embodiment, the method may be useful for analyzing language in an oral form rather than a written form. Thus, instead of receiving a written text input, the input may be an audio file or a video file. The method may then be configured to analyze the text as described above, turning the language into information blocks, populating data structures and information block databases, and being able to perform functions of query, contribution, command and dialogue using the resulting information blocks.

The method may be used both for 'live' audio, such as the audio of an ongoing conversation or of a live security camera feed, or 'past' audio, such as a previously recorded audio or video file.

In some embodiments, the method may be equipped with speech-to-text functionality, allowing it to convert the spoken language of live or past audio into written textual form before beginning steps 20 to 40 for text analysis.

In some embodiments, the method may further be equipped to record information about the time dimension of an audio file. For example, it may be useful for a user to know when in an audio file a particular question was asked. The method may thus record, in each information block, information about the location of the information with regards to the time dimension in the audio file which was analyzed (e.g., a timestamp). If the audio is live, the method may be equipped with a clock or timer or other time-measuring system, allowing the method to record what was said at which times, and include that information in the information blocks. As discussed previously, time components are extremely important for the creation of information blocks and for the organization of information thereafter. For example, because an audio file has a timeline, it is easy for the method to understand that certain events (certain spoken words) occur before or after others, and sometimes, the method may know the exact amount of time between two events. Information about time may be integrated into the information blocks.

In some embodiments, the method may be equipped to identify the speaker of text by their voice, or at least be able to differentiate one unknown speaker from another until the speakers are identified. For example, it may be useful for a user to know who said what in a conversation or debate. Information about the speaker or source of text may be saved in the information blocks generated from that text. In embodiments involving audio information such as recording containing spoken language, the method may be configured to identify the speaker by one or more factors specific to the voice of the individual. In a preferred embodiment, the identification of the individual may be done by comparing the frequency of the speaker to other frequencies of known or previously identified individuals. Other factors may also be used to distinguish between speakers that are not yet identified as separate individuals, such as phonation, pitch, or loudness. Of course, the identity of the speaker may also be manually identified by a user of the method during or after the recording of the audio file. In some embodiments, the identity of the speaker may be useful for a number of reasons, for example, for the production of a transcript of an audio file of a conversation or of a meeting. It may also be useful for the method to correctly create the information blocks concerning the recording, so that the method can keep track of who said what when it is answering queries or checking for consistency.

In some embodiments, it may not be possible to identify text from speech. For example, the speech-to-text machinery may fail, for example a microphone may malfunction, or a person may simply speak too softly for the speech to be detected, or another sudden sound may overshadow the speech. In these situations, the method may perform corrections to the resulting text in an attempt to recreate the speech. In some embodiments, this may involve using conventional autocorrecting software. In other embodiments, the method may use its own information block databases and/or one or more validation tables containing information on how to correct speech-to-text. As always, a user may review such corrections or perform additional corrections manually.

In some embodiments, the person speaking may make mistakes as they speak, or may backtrack, or correct themselves as they talk. The method may perform similar corrections to address these errors.

In some embodiments, the method may be equipped to identify interruptions or other sounds that aren't strictly speaking language. For example, the method may be configured to identify grunts, sighs, crashes, silences, yelps, or even various non-human sounds such as sirens from emergency vehicles. The identification of these sounds may lead to the creation of information blocks about the sounds, so that the method can answer questions such as "when did the firemen get on scene", which may be answered by identifying when the sirens could be heard.

Information such as the identity of the speaker or of the time that information was communicated, being information that is not part of the text of the audio, may be collected, sensed or saved by an additional module not shown in FIG. 3, and later added to information blocks after information blocks have been formed at step 32.

By performing the above, the method may be configured to produce a detailed transcript of an audio or video recording, containing such detailed information as timestamps of different sentences or the identity of speakers. The method may also be configured to produce a summary of the audio or video recording, including information about the contributions from different speakers.

The method may be configured to perform query, contribution, command or dialogue functions, described above in greater detail, with regards to information gathered from audio sources. The usefulness of the method should be readily apparent. Few tools exist to easily search through audio information. However, using this method, a user may be able to quickly find answers to questions by querying the method. For example, a user may query "What was discussed in the board meeting dated Jul. 5, 2018?", or "Who suggested we accept the deal?" to obtain information about the meeting. In some embodiments, the method may be configured to retrieve one or more portions of the audio source of information that correspond to the answer of the query, and may play those portions of the audio or video file for the user to view as part of the answer to the query.

Contribution is also useful. The method may be configured to analyze the text as it is spoken and determine if the speaker is introducing inconsistencies in the system. For example, a user may say "Let's schedule another meeting at 2 pm tomorrow.", and the method may determine that certain members of the meeting are not available tomorrow at 2 pm and provide an alert or notification to that effect. In circumstances where a user says something that is deemed to be inconsistent with current information saved in one or more databases, the speaker or another user may be alerted to the inconsistency by an alert, such as a red outline on the computer screen in the context of an online meeting.

Command is also useful. The method may be configured to analyze the text as it is spoken and determine whether the speaker is issuing a command. For example, the user may say "print the document", and the method may then execute the task of printing the document.

Dialogue is also useful. The method may be configured to analyze the text as it is spoken and perform exchanges with a speaker. For example, the method may be useful for collecting patient data at a doctor's office. The method may perform dialogue with patients to obtain basic patient information, asking numerous questions about patient data and only continuing when enough information has been provided. In some embodiments, the method may be able to interact with participants to a call and provide information to participants (e.g., providing forms that the participants are required to fill out, answering questions, similar to the dialog functionality previously discussed, etc.). This may involve receiving audio questions, analyzing the text of the audio, and providing textual responses.

It should be understood that the different functions are not exclusive to one another. The method may be configured to perform more than one at the same time, or different functions depending on the input into the system. For example, it would be extremely useful for a doctor to interview patients over the phone or over video conference, and be able to have the method automatically populate patient files with relevant answers or information provided during the call, while also alerting a doctor to the consistency of the answers compared to the information already on file, and also being able to answer the doctor's queries about the file or past visits. In some embodiments, the method may be able to alert a user (e.g., the doctor) that certain required information (e.g., whether the patient is currently taking other medication) has not yet been received. The usefulness is readily apparent in other contexts as well, such as oral or online business meetings, interviews, oral trials, or merely conversations over social media.

It should be understood that all the functions can be used for both live audio and past audio. It should be understood that all the functions can be performed on local communications or hardware and in an online environment.

The method may thus greatly increase the convenience of reporting, as employees such as engineers or construction workers can talk as they work, or report while they commute to or from a work site. It may also be useful for analyzing calls between workers to keep track of progress on projects.

The method may be readily integrated with existing audio call or videoconference applications, or audio or video recording applications or systems.

The ability to work with audio and video files is useful for a user to easily find information contained within an audio or video file whose location is forgotten, for complementing or completing various audio or video services, such as videoconference services, and for easily keeping tabs of which speakers or participants contributed what kind of information. The latter is particularly useful for proving the source of information.

The method described above therefore proposes a unique approach to non-statistical text analysis. Text may be broken down into observations, which can in turn be broken down into primary and secondary blocks of information, which can in turn be broken down into combinations of categories and expressions and terms, which in turn can be broken down into their individual meanings.

The method described above overcomes various pitfalls of conventional AI and statistical text analysis. Namely, conventional AI and statistical text analysis suffer from two main disadvantages: the creation or modification of their own rules in unpredictable ways as they 'learn', and the fact that they cannot accurately explain or provide sources for the determinations or assertions they make.

The current method avoids these pitfalls by having its own predetermined rules that aren't changed over time, thereby allowing a user a measure of certainty when using the program and allowing an administrator or programmer to determine how the method made a particular determination or assertion. For example, the method may keep a list of steps it took to arrive at a determination (which databases were searched, what were the search terms, what was returned, etc.). Additionally, the predetermined rules are capable of not being changed from implementation to implementation, allowing the method to be consistent in different contexts.

It is important to note that various aspects of the method may be created with the aid of AI or statistical programs. For example, if may be useful to use AI to generate a category association table containing the possible meanings of all words in a language. However, once the predetermined rules and tables are vetted and implemented, they do not change, conferring the method a measure of predictability and certainty. The AI or statistical tools will not be used to provide judgements about a text or inferences.

Due to the predetermined nature of the rules and the various parts (e.g., category association table, databases, etc.) of the method, the method may be configured to operated without an internet connection and perform all determinations on a local device. Alternatively, the various rules and parts of the method may be configured to receive periodic updates from a server, allowing an administrator to correct or refine the method to the particular implementation.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method for processing natural language text, said text being converted into suitable structured, annotated data, the method comprising:
   a) receiving said text and segmenting said text into individual terms;
   b) determining for each one of said individual terms one or more semantic categories using a semantic category lexicon, wherein some of said terms belong to more than one semantic category for a same part of speech;
   c) using a category association table to assign one of said one or more semantic categories to said individual terms;
   d) organizing ones of said individual terms that are linked together into expressions, said expressions having an assigned semantic category;
   e) standardizing terms or expressions with established terms or expressions found, at least, in other information blocks;
   f) segmenting said text into said information blocks using semantic categories indicative of information block breaks;
   g) identifying and adding hierarchical information to said information blocks; and
   h) processing said information blocks to determine at least one information block specific attribute from a combination of term values, categories, expressions and hierarchical information of said information blocks.

2. The method of claim 1, further comprising:
   i) processing said information blocks and said at least one information block specific attribute to populate at least one information block database related to a state of an environment or topic of said text.

3. The method of claim 1, further comprising validating the semantic categories of terms or expressions, the organization of terms into expressions, segmentation of text into information blocks, standardization of terms, block hierarchy or block specific attributes of existing information blocks upon the creation or processing of a new information block.

4. The method of claim 1, wherein at least one of the semantic category lexicon, the category association table, established terms or expressions or information block databases comprises custom information specific to a user or are influenced by user settings.

5. The method of claim 2, wherein the at least one information block database related to a state of an environment or topic of said text comprises a general database, an inventory database, a state database and a transaction database.

6. The method of claim 2, further comprising analyzing the at least one information block database to establish at least one inference based on information blocks within said at least one information block database, creating information not previously contained within said at least one information block database.

7. The method of claim 1, wherein standardizing expressions comprises determining that one of said individual terms is referring to multiple items and separating said one of said individual terms into a plurality of individual terms, and wherein segmenting terms or expressions into said information blocks comprises creating an information block for each of said plurality of individual terms.

8. A method of answering an essentially unconstrained natural language query about an essentially unconstrained natural language target text, the method comprising:
   a) processing the target text into suitable structured, annotated data by the method of claim 1, to obtain text information blocks;
   b) populating at least one information block database related to a state of an environment or topic of said target text with text information blocks;
   c) processing the essentially unconstrained natural language query into suitable structured, annotated data by the method of claim 1, to obtain query information blocks;
   d) identifying an unknown information from the query information blocks;
   e) using information in the query information blocks to filter the at least one information block database and identify text information blocks containing information of the same type as the unknown information from the query information blocks;
   f) answering the query by presenting the information of the same type as the unknown information.

9. The method of claim 8, wherein answering the query comprises formulating a natural language response containing the information of the same type as the unknown information.

10. The method of claim 8, wherein answering the query comprises highlighting or identifying one or more locations in the target text where the information of the same type as the unknown information can be found.

11. The method of claim 8, wherein answering the query comprises providing a shortened version of the target text to a user.

12. A method of identifying inconsistencies between natural language contributions and an essentially unconstrained natural language existing text that the contributions are is directed to, the method comprising:
   a) processing the existing text into suitable structured, annotated data by the method of claim 1, to obtain text information blocks;
   b) populating at least one information block database related to a state of an environment or topic of said existing text with text information blocks;
   c) processing an essentially unconstrained natural language contribution into suitable structured, annotated data by the method of claim 1, to obtain contribution information blocks;
   d) comparing the contribution information blocks to the information blocks in the at least one information block database;
   e) identifying one or more inconsistencies between the contribution information blocks and the information blocks in the at least one information block database;
   f) notifying a user of an identified inconsistency.

13. The method of claim 12, wherein the essentially unconstrained natural language contribution comprises a removal of characters from the existing text.

14. The method of claim 12, wherein notifying a user of an identified inconsistency comprises formulating a natural language indication of the inconsistency.

15. The method of claim 12, wherein notifying a user of an identified inconsistency comprises highlighting or identifying one or more locations in the existing text where the identified inconsistency can be found.

16. A method of accepting and acting upon a natural language command, the method comprising:
   a) processing the natural language command into suitable structured, annotated data by the method of claim 1, to obtain command information blocks;
   b) identifying an action to be performed from the command information blocks and at least one command database;
   c) performing the identified action.

17. The method of claim 16, wherein identifying an action to be performed from the command information blocks and at least one command database further comprises consulting the at least one information block database related to a state of an environment or topic of said text.

18. A method of dialoguing with a user communicating in natural language responses, the method comprising:
   a) processing the natural language responses into suitable structured, annotated data by the method of claim 1, to obtain response information blocks;
   b) determining, based on the response information blocks, a challenge to present to the user.

19. The method of claim 18, wherein determining a challenge to present to the user comprises consulting an information block database containing information about how to respond to the user.

20. The method of claim 18, wherein determining a challenge to present to the user comprises determining whether the response information blocks contain a minimum amount or type of information.

21. The method of claim 18, wherein determining a challenge to present to the user comprises consulting the at least one information block database related to a state of an environment or topic of said text.

22. A non-transitory computer-readable media having information embodied therein that, when executed by a processor, is configured to execute the method of any one of claims 1 to 7.

23. A non-transitory computer-readable media having information embodied therein that, when executed by a processor, is configured to execute the method of any one of claims 12 to 15.

* * * * *